United States Patent
Ugur et al.

(10) Patent No.: US 10,230,977 B2
(45) Date of Patent: *Mar. 12, 2019

(54) APPARATUS, A METHOD AND A COMPUTER PROGRAM FOR VIDEO CODING AND DECODING

(71) Applicant: Nokia Technologies Oy, Espoo (FI)

(72) Inventors: Kemal Ugur, Istanbul (TR); Mehmet Oguz Bici, Tampere (FI); Miska Matias Hannuksela, Tampere (FI)

(73) Assignee: Nokia Technologies Oy, Espoo (FI)

(*) Notice: Subject to any disclaimer, the term of this patent is extended or adjusted under 35 U.S.C. 154(b) by 0 days.

This patent is subject to a terminal disclaimer.

(21) Appl. No.: 15/645,753

(22) Filed: Jul. 10, 2017

(65) Prior Publication Data
US 2017/0310989 A1    Oct. 26, 2017

Related U.S. Application Data

(63) Continuation of application No. 14/036,884, filed on Sep. 25, 2013, now Pat. No. 9,706,199.
(Continued)

(51) Int. Cl.
  *H04N 19/105* (2014.01)
  *H04N 19/52* (2014.01)
  (Continued)

(52) U.S. Cl.
  CPC .......... *H04N 19/52* (2014.11); *H04N 19/105* (2014.11); *H04N 19/107* (2014.11);
  (Continued)

(58) Field of Classification Search
  CPC .. H04N 19/105; H04N 19/156; H04N 19/159; H04N 19/172; H04N 19/30;
  (Continued)

(56) References Cited

U.S. PATENT DOCUMENTS

7,586,924 B2 * 9/2009 Wiegand .......... H04L 29/06027
                                                    370/395.64
9,516,379 B2   12/2016 Chen et al.
(Continued)

FOREIGN PATENT DOCUMENTS

CN    101185332    5/2008
CN    101213841    7/2008
(Continued)

OTHER PUBLICATIONS

Aminlou et al, Differential coding using enhancement inter-layer reference picture for the scalable extension of H.265/HEVC video codec (Year: 2014).*
(Continued)

*Primary Examiner* — Shan E Elahi
(74) *Attorney, Agent, or Firm* — Alston & Bird LLP

(57) ABSTRACT

There are disclosed various methods, apparatuses and computer program products for video encoding and decoding. In other embodiments, there is provided a method, an apparatus, a computer readable storage medium stored with code thereon for use by an apparatus, and a video encoder, for encoding a scalable bitstream, to provide indicating an encoding configuration, where only samples and syntax from intra coded pictures of base layer is used for coding the enhancement layer pictures. In other embodiments, there is provided an apparatus, a computer readable storage medium stored with code thereon for use by an apparatus, and a video decoder, for decoding a scalable bitstream, to receive indications of an encoding configuration, where only samples and syntax from intra coded pictures of base layer is used for coding the enhancement.

16 Claims, 9 Drawing Sheets

Related U.S. Application Data

(60) Provisional application No. 61/707,185, filed on Sep. 28, 2012.

(51) Int. Cl.

| | | |
|---|---|---|
| *H04N 19/46* | (2014.01) | |
| *H04N 19/30* | (2014.01) | |
| *H04N 19/159* | (2014.01) | |
| *H04N 19/172* | (2014.01) | |
| *H04N 19/593* | (2014.01) | |
| *H04N 19/107* | (2014.01) | |
| *H04N 19/70* | (2014.01) | |
| *H04N 19/156* | (2014.01) | |

(52) U.S. Cl.
CPC ......... *H04N 19/159* (2014.11); *H04N 19/172* (2014.11); *H04N 19/30* (2014.11); *H04N 19/46* (2014.11); *H04N 19/593* (2014.11); *H04N 19/156* (2014.11); *H04N 19/70* (2014.11)

(58) Field of Classification Search
CPC ...... H04N 19/46; H04N 19/52; H04N 19/593; H04N 19/70
USPC .................................................. 375/240.12
See application file for complete search history.

(56) References Cited

U.S. PATENT DOCUMENTS

| | | |
|---|---|---|
| 2005/0053143 A1 | 3/2005 | Holcomb et al. |
| 2006/0120455 A1 | 6/2006 | Park et al. |
| 2007/0014346 A1 | 1/2007 | Wang et al. |
| 2007/0086521 A1 | 4/2007 | Wang et al. |
| 2007/0110150 A1* | 5/2007 | Wang ............. H04N 21/234327 375/240.1 |
| 2007/0230564 A1 | 10/2007 | Chen et al. |
| 2007/0263087 A1* | 11/2007 | Hong ..................... H04N 7/152 348/14.13 |
| 2008/0165850 A1 | 7/2008 | Sagetong et al. |
| 2008/0165855 A1 | 7/2008 | Wang et al. |
| 2009/0296811 A1* | 12/2009 | Jeon ..................... H04N 19/597 375/240.12 |
| 2009/0310680 A1 | 12/2009 | Jeon et al. |
| 2010/0020866 A1 | 1/2010 | Marpe et al. |
| 2010/0329341 A1 | 12/2010 | Kam et al. |
| 2011/0134994 A1 | 6/2011 | Lu et al. |
| 2011/0194613 A1 | 8/2011 | Chen et al. |
| 2011/0216836 A1* | 9/2011 | Luo ........................ H04N 19/00 375/240.25 |
| 2011/0228858 A1 | 9/2011 | Budagavi et al. |
| 2011/0280316 A1 | 11/2011 | Chen et al. |
| 2012/0075436 A1 | 3/2012 | Chen et al. |
| 2012/0230401 A1 | 9/2012 | Chen et al. |
| 2012/0230431 A1 | 9/2012 | Boyce et al. |
| 2012/0236942 A1* | 9/2012 | Lin ........................ H04N 19/52 375/240.16 |
| 2012/0269276 A1* | 10/2012 | Hong ..................... H04N 19/70 375/240.25 |
| 2013/0022113 A1* | 1/2013 | Chen .................... H04N 19/597 375/240.12 |
| 2013/0034170 A1* | 2/2013 | Chen ..................... H04N 13/00 375/240.25 |
| 2013/0182755 A1* | 7/2013 | Chen ..................... H04N 19/70 375/240.01 |
| 2013/0279576 A1 | 10/2013 | Chen et al. |
| 2014/0010277 A1 | 1/2014 | Wang et al. |
| 2014/0092963 A1* | 4/2014 | Wang ..................... H04N 19/50 375/240.12 |
| 2014/0092978 A1 | 4/2014 | Bugdayci et al. |
| 2015/0181233 A1* | 6/2015 | Ramasubramonian ...... H04N 19/52 375/240.16 |
| 2016/0044324 A1* | 2/2016 | Deshpande ............ H04N 19/70 375/240.25 |
| 2016/0165248 A1 | 6/2016 | Lainema et al. |
| 2017/0094302 A1* | 3/2017 | Hendry .......... H04N 21/234327 |

FOREIGN PATENT DOCUMENTS

| | | |
|---|---|---|
| CN | 101411192 | 4/2009 |
| CN | 101427573 | 5/2009 |
| CN | 101888559 | 11/2010 |
| WO | WO 2007/110757 | 10/2007 |

OTHER PUBLICATIONS

Boyce at el., "High Level Syntax Hooks for Future Extensions", Joint Collaborative Team on Video Coding (JCT-VC) of ITU-T SG16 WP3 and ISO/IEC JTC1/SC29/WG11, 8th Meeting, Feb. 1-10, 2012, pp. 1-6.

Bross et al., "High Efficiency Video Coding (HEVC) Text Specification Draft 7", Joint Collaborative Team on Video Coding (JCT-VC) of ITU-T SG16 WP3 and ISO/IEC JTC1/SC29/WG11, 9th Meeting, Apr. 27-May 7, 2012, 297 pages.

Extended European Search Report for corresponding European Application No. 13841278.8 dated Apr. 26, 2016, 10 pages.

Guo et al., "On Discardable Lower Layer Adaptations", Joint Video Team (JVT) of ISO/IEC MPEG & ITU-T VCEG (ISO/IEC JTC1/SC29/WG11 and ITU-T SG16 Q.6), JVT-S039, 19th Meeting, Mar. 31-Apr. 7, 2006, pp. 1-11.

Hendry (LG) et al., *AHG 9: Signalling Inter-layer Prediction Indication*, Joint Collaborative Team on Video Coding (JCT-VC) of ITU-T SG16 WP3 and ISO/IEC JTC1/SC29/WG11, $13^{th}$ Meeting: Incheon, KR, Document JCTVC-M0203 (Apr. 18-26, 2013) 3 pages.

International Search Report and Written Opinion received for corresponding Patent Cooperation Treaty Application No. PCT/FI2013/050931, dated Jan. 10, 2014, 17 pages.

ISO/IEC JTC1/SC29/WG11 (MPEG) output document N5540, "Applications and Requirements for Scalable Video Coding", the 64th MPEG meeting, (Mar. 2003) 14 pages.

Kim et al., "Fast Mode Decision for Combined Scalable Video Coding Based on the Block Complexity Function", IEEE Transactions on Consumer Electronics, vol. 57, Issue 1, Feb. 2011, pp. 247-252.

Lasserre, S. et al., *Low Complexity Scalable Extension of HEVC intra pictures*, Joint Collaborative Team on Video Coding (JCT-VC) of ITU-T SG16 WP3 and ISO/IEC JTC1/SC29/WG11, $7^{th}$ Meeting: Geneva, CH, 21-30, Document JCTVC-G248(Nov. 2011) 8 pages.

Li et al., "Performance Analysis of Inter-Layer Prediction in Scalable Video Coding Extension of H.264/AVC", IEEE Transactions on Broadcasting, vol. 57, Issue 1, Mar. 2011, pp. 66-74.

Mathew et al., "Discardable Bits and Multi-Layer RD Estimation for Single Loop Decoding", Joint Video Team (JVT) of ISO/IEC MPEG & ITU-T VCEG (ISO/IEC JTC1/SC29/WG11 and ITU-T SG16 Q.6), JVT-R050, 18th Meeting, Jan. 14-20, 2006, pp. 1-10.

Office Action for corresponding Chinese Application No. 201380061556.5 dated May 3, 2017, 10 pages.

Office Action for corresponding Korean Application No. 10-2015-7010909 dated Jun. 30, 2016.

Roodaki, H. et al., *Lightweight single-loop scalability with SHVC*, Joint Collaborative Team on Video Coding (JCT-VC) of ITU-T SG16 WP3 and ISO/IEC JTC1/SC29/WG11, $12^{th}$ Meeting: Geneva, CH, Document JCTVC-L0111 (Jan. 14-23, 2013) 2 pages.

Sato, K., *On inter-layer prediction enabling/disabling for HEVC scalable extensions*, Joint Collaborative Team on Video Coding (JCT-VC) of ITU-T SG16 WP3 and ISO/IEC JTC1/SC29/WG11, $11^{th}$ Meeting, Shanghai, CN, Document JCTVC-K0175rl (Oct. 10-19, 2012) 6 pages.

Schulzrinne et al., "RTP: A Transport Protocol for Real-Time Applications", Network Working Group, RFC3550, Jul. 2003, pp. 1-89.

(56) References Cited

OTHER PUBLICATIONS

Schwarz, H. et al., *Constrained Inter-Layer Prediction for Single-Loop Decoding in Spatial Scalability*, Image Processing, IEEE International Conference, vol. 2 (Sep. 2005) 4 pages.

Shi et al., "Spatially Scalable Video Coding for HEVC", IEEE International Conference on Multimedia and Expo, Jul. 9-13, 2012, 1091-1096.

Wenger et al. "Codec Control Messages in the RTP Audio-Visual Profile with Feedback (AVPF)", Network Working Group, RFC5104, Feb. 2008, pp. 1-64.

Wenger et al., "Extended RTP Profile for Real-Time Transport Control Protocol (RTCP)-Based Feedback (RTP/AVPF)", Network Working Group, RFC4585, Jul. 2006, pp. 1-51.

Zhang et al., "Frame Based Selective Inter-Layer Prediction", Joint Video Team (JVT) of ISO/IEC MPEG & ITU-TVCEG (ISO/IEC JTC1/SC29/WG11 and ITU-T SG16 Q.6), JVT-S051, 19th Meeting, Mar. 31-Apr. 7, 2006, pp. 1-13.

Zhang et al., "Joint Multiview Video Plus Depth Coding", 17th IEEE International Conference on Image Processing, Sep. 26-29, 2010, pp. 2865-2868.

Zhang et al., "Selective Inter-Layer Prediction", Joint Video Team (JVT) of ISO/IEC MPEG & ITU-T VCEG (ISO/IEC JTC1/SC29/WG11 and ITU-T SG16 Q.6), JVT-R064, 18th Meeting, Jan. 14-20, 2006, pp. 1-16.

Notice of Allowance for corresponding U.S. Appl. No. 14/036,884 dated Jun. 8, 2017.

Notice of Allowance for corresponding U.S. Appl. No. 14/036,884 dated Mar. 3, 2017.

Office Action for corresponding U.S. Appl. No. 14/036,884 dated Jun. 8, 2016.

Office Action for corresponding U.S. Appl. No. 14/036,884 dated Sep. 23, 2015.

Office Action for Chinese Application No. 201380061556.5 dated Dec. 25, 2017, 4 pages total.

\* cited by examiner

APPARATUS, A METHOD AND A COMPUTER PROGRAM FOR VIDEO CODING AND DECODING

CROSS-REFERENCE TO RELATED APPLICATIONS

The present application is a continuation of U.S. patent application Ser. No. 14/036,884 filed Sep. 25, 2013 which, in turn, claims priority from U.S. Provisional Patent Application No. 61/707,185 filed Sep. 28, 2012, the contents of each of which is incorporated herein in its entirety by reference.

TECHNICAL FIELD

The present invention relates to an apparatus, a method and a computer program for video coding and decoding.

BACKGROUND INFORMATION

A video codec may comprise an encoder which transforms input video into a compressed representation suitable for storage and/or transmission and a decoder that can uncompress the compressed video representation back into a viewable form, or either one of them. Typically, the encoder discards some information in the original video sequence in order to represent the video in a more compact form, for example at a lower bit rate.

Scalable video coding refers to coding structure where one bitstream can contain multiple representations of the content at different bitrates, resolutions or frame rates. A scalable bitstream typically consists of a "base layer" providing the lowest quality video available and one or more enhancement layers that enhance the video quality when received and decoded together with the lower layers. In order to improve coding efficiency for the enhancement layers, the coded representation of that layer typically depends on the lower layers.

Video coding methods typically utilize motion compensated prediction, where an area in one of the previously coded video frames that corresponds closely to the block being coded is used as reference for encoding the current frame. A reconstructed picture, obtained after the motion compensation, usually has various artifacts such as blocking, ringing etc. In order to eliminate the artifacts, various post-processing operations such as loop filtering are applied. In single loop decoding, used for example in H.264/SVC video coding, enhancement layer pictures are coded only referring to intra coded samples from the base layer and also decoded syntax elements. In other words, temporally predicted blocks are not decoded in the base layer and only a single motion compensated loop is needed to decode the enhancement layer pictures.

Nevertheless, the single loop decoding has drawbacks, mainly due to the fact that syntax elements related to inter pictures still need to be decoded. In other words, entire inter base layer pictures still need to be transmitted to the scalable decoder, even if only a small portion of data within the picture is required for the enhancement layer decoding process. Moreover, single loop decoding is difficultly applicable for standard scalable use-cases, where e.g. enhancement layer is coded with Scalable HEVC coding, while base layer is coded with H.264/AVC coding, since the syntax elements of base layer are needed.

SUMMARY

This invention proceeds from the consideration that a new sequence level indication is provided, capable of indicating an encoding configuration, where only samples and syntax from intra coded pictures of base layer is used for coding the enhancement layer pictures.

A method according to a first embodiment involves a method comprising:

obtaining information relating to use of inter-layer prediction only from certain types of pictures in a base layer of a scalable video sequence;

encoding one or more indications relating to use of picture types and/or NAL unit types for inter-layer prediction; and encoding pictures into a bitstream of the scalable video sequence according to the one or more indication for inter-layer prediction.

According to an embodiment, the method further comprises encoding one or more additional indications refining the one or more indications relating to use of picture types and/or NAL unit types for inter-layer prediction to be specific for certain layers.

According to an embodiment, the information relating to use of inter-layer prediction restricts the use of inter-layer prediction to intra-coded pictures in a base layer of a scalable video sequence.

According to an embodiment, the information relating to use of inter-layer prediction restricts the use of inter-layer prediction to random access point (RAP) pictures in a base layer of a scalable video sequence.

According to an embodiment, the method further comprises determining the information relating to use of inter-layer prediction on the basis of available computational resources, available memory for reference frame storage, available memory access bandwidth, and/or implemented inter-layer coding tools.

According to an embodiment, the method further comprises encoding said one or more indications in one or more syntax elements.

According to an embodiment, wherein said one or more syntax elements are included in a video parameter set structure, a sequence parameter set structure, and/or a supplemental enhancement information (SEI) message.

An apparatus according to a second embodiment comprises:

a video encoder configured for encoding a scalable bitstream comprising a base layer and at least one enhancement layer, wherein said video encoder is further configured for obtaining information relating to use of inter-layer prediction only from certain types of pictures in a base layer of a scalable video sequence;

encoding one or more indications relating to use of picture types and/or NAL unit types for inter-layer prediction; and encoding pictures into a bitstream of the scalable video sequence according to the one or more indication for inter-layer prediction.

According to a third embodiment there is provided a computer readable storage medium stored with code thereon for use by an apparatus, which when executed by a processor, causes the apparatus to perform:

obtaining information relating to use of inter-layer prediction only from certain types of pictures in a base layer of a scalable video sequence;

encoding one or more indications relating to use of picture types and/or NAL unit types for inter-layer prediction; and encoding pictures into a bitstream of the scalable video sequence according to the one or more indication for inter-layer prediction.

According to a fourth embodiment there is provided at least one processor and at least one memory, said at least one memory stored with code thereon, which when executed by said at least one processor, causes an apparatus to perform:
obtaining information relating to use of inter-layer prediction only from certain types of pictures in a base layer of a scalable video sequence;
encoding one or more indications relating to use of picture types and/or NAL unit types for inter-layer prediction; and
encoding pictures into a bitstream of the scalable video sequence according to the one or more indication for inter-layer prediction.

A method according to a fifth embodiment comprises a method for decoding a scalable bitstream comprising a base layer and at least one enhancement layer, the method comprising
receiving at least a part of the bitstream and one or more indications associated with the bitstream, the indications relating to use of picture types and/or NAL unit types for inter-layer prediction;
determining one or more target output layers for decoding;
decoding from the one or more indications associated with the bitstream information relating to use of picture types and/or NAL unit types for inter-layer prediction;
determining combinations of picture types and/or NAL unit types and layer identifier values that are not to be decoded and/or combinations of picture types and/or NAL unit types and layer identifier values that are to be decoded; and
decoding the NAL units of the bitstream indicated by the combinations of picture types and/or NAL unit types and layer identifier values to be decoded.

According to an embodiment, the method further comprises decoding one or more additional indications refining the one or more indications relating to use of picture types and/or NAL unit types for inter-layer prediction to be specific for certain layers.

According to an embodiment, the method further comprises omitting the NAL units of the bitstream indicated by the combinations of picture types and/or NAL unit types and layer identifier values not to be decoded.

According to an embodiment, the method further comprises determining the one or more target output layers for decoding on the basis available computational resources, available memory for reference frame storage, available memory access bandwidth, and/or implemented inter-layer coding tools of a decoding apparatus.

According to an embodiment, the one or more target output layers are characterized by more than one layer identifier.

According to an embodiment, the information relating to use of inter-layer prediction restricts the use of inter-layer prediction to intra-coded pictures in a base layer of a scalable video sequence.

According to an embodiment, the information relating to use of inter-layer prediction restricts the use of inter-layer prediction to random access point (RAP) pictures in a base layer of a scalable video sequence.

According to an embodiment, the method further comprises decoding said one or more indications from one or more syntax elements.

According to an embodiment, wherein said one or more syntax elements are included in a video parameter set structure, a sequence parameter set structure, and/or a supplemental enhancement information (SEI) message.

An apparatus according to a sixth embodiment comprises:
a video decoder configured for decoding a scalable bitstream comprising a base layer and at least one enhancement layer, the video decoder being configured for
receiving at least a part of the bitstream and one or more indications associated with the bitstream, the indications relating to use of picture types and/or NAL unit types for inter-layer prediction;
determining one or more target output layers for decoding;
decoding from the one or more indications associated with the bitstream information relating to use of picture types and/or NAL unit types for inter-layer prediction;
determining combinations of picture types and/or NAL unit types and layer identifier values that are not to be decoded and/or combinations of picture types and/or NAL unit types and layer identifier values that are to be decoded; and
decoding the NAL units of the bitstream indicated by the combinations of picture types and/or NAL unit types and layer identifier values to be decoded.

According to a seventh embodiment there is provided a computer readable storage medium stored with code thereon for use by an apparatus, which when executed by a processor, causes the apparatus to perform:
receiving at least a part of the bitstream and one or more indications associated with the bitstream, the indications relating to use of picture types and/or NAL unit types for inter-layer prediction;
determining one or more target output layers for decoding;
decoding from the one or more indications associated with the bitstream information relating to use of picture types and/or NAL unit types for inter-layer prediction;
determining combinations of picture types and/or NAL unit types and layer identifier values that are not to be decoded and/or combinations of picture types and/or NAL unit types and layer identifier values that are to be decoded; and
decoding the NAL units of the bitstream indicated by the combinations of picture types and/or NAL unit types and layer identifier values to be decoded.

According to an eighth embodiment there is provided at least one processor and at least one memory, said at least one memory stored with code thereon, which when executed by said at least one processor, causes an apparatus to perform:
receiving at least a part of the bitstream and one or more indications associated with the bitstream, the indications relating to use of picture types and/or NAL unit types for inter-layer prediction;
determining one or more target output layers for decoding;
decoding from the one or more indications associated with the bitstream information relating to use of picture types and/or NAL unit types for inter-layer prediction;
determining combinations of picture types and/or NAL unit types and layer identifier values that are not to be decoded and/or combinations of picture types and/or NAL unit types and layer identifier values that are to be decoded; and decoding the NAL units of the bitstream indicated by the combinations of picture types and/or NAL unit types and layer identifier values to be decoded.

A method according to a ninth embodiment comprises a method for modifying a scalable bitstream comprising a base layer and at least one enhancement layer, the method comprising receiving at least a part of the bitstream and one or more indications associated with the bitstream, the indications relating to use of picture types and/or NAL unit types for inter-layer prediction;

determining one or more target output layers for decoding;

decoding from the one or more indications associated with the bitstream information relating to use of picture types and/or NAL unit types for inter-layer prediction;

determining combinations of picture types and/or NAL unit types and layer identifier values that are not to be forwarded and/or combinations of picture types and/or NAL unit types and layer identifier values that are to be forwarded; and forwarding the NAL units of the bitstream indicated by the combinations of picture types and/or NAL unit types and layer identifier values to be forwarding.

An apparatus according to a tenth embodiment comprises:

a bitstream modifier configured for modifying a scalable bitstream comprising a base layer and at least one enhancement layer, the bitstream modifier being configured for receiving at least a part of the bitstream and one or more indications associated with the bitstream, the indications relating to use of picture types and/or NAL unit types for inter-layer prediction;

determining one or more target output layers for decoding;

decoding from the one or more indications associated with the bitstream information relating to use of picture types and/or NAL unit types for inter-layer prediction;

determining combinations of picture types and/or NAL unit types and layer identifier values that are not to be forwarded and/or combinations of picture types and/or NAL unit types and layer identifier values that are to be forwarded; and forwarding the NAL units of the bitstream indicated by the combinations of picture types and/or NAL unit types and layer identifier values to be forwarding.

According to an eleventh embodiment there is provided a video encoder configured for encoding a scalable bitstream comprising a base layer and at least one enhancement layer, wherein said video encoder is further configured for:

obtaining information relating to use of inter-layer prediction only from certain types of pictures in a base layer of a scalable video sequence;

encoding one or more indications relating to use of picture types and/or NAL unit types for inter-layer prediction; and encoding pictures into a bitstream of the scalable video sequence according to the one or more indication for inter-layer prediction.

According to a twelfth embodiment there is provided a video decoder configured for decoding a scalable bitstream comprising a base layer and at least one enhancement layer, wherein said video decoder is further configured for:

receiving at least a part of the bitstream and one or more indications associated with the bitstream, the indications relating to use of picture types and/or NAL unit types for inter-layer prediction;

determining one or more target output layers for decoding;

decoding from the one or more indications associated with the bitstream information relating to use of picture types and/or NAL unit types for inter-layer prediction;

determining combinations of picture types and/or NAL unit types and layer identifier values that are not to be decoded and/or combinations of picture types and/or NAL unit types and layer identifier values that are to be decoded; and decoding the NAL units of the bitstream indicated by the combinations of picture types and/or NAL unit types and layer identifier values to be decoded.

DESCRIPTION OF THE DRAWINGS

For better understanding of the present invention, reference will now be made by way of example to the accompanying drawings in which.

DETAILED DESCRIPTION OF SOME EXAMPLE EMBODIMENTS OF THE INVENTION

Figure 1:
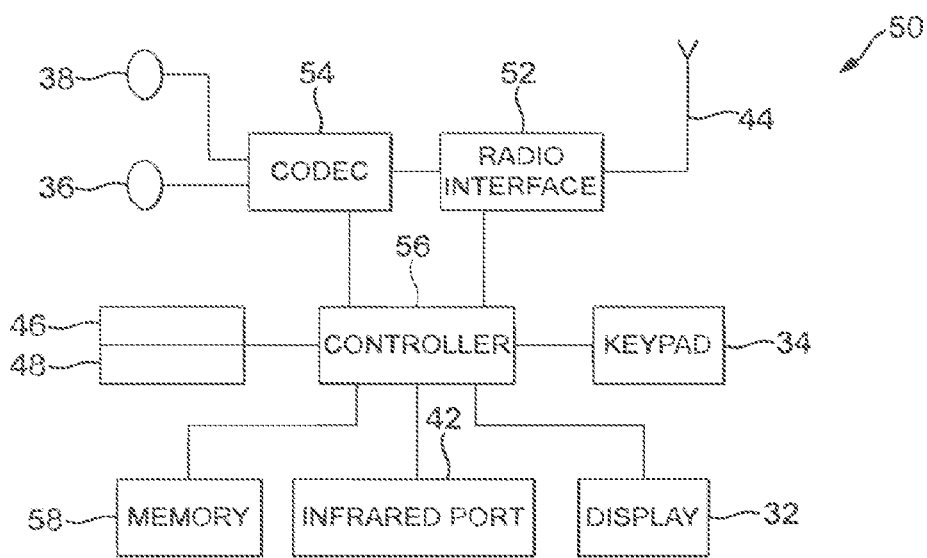
FIG. 1 shows schematically an electronic device employing some embodiments of the invention.
Figure 2:
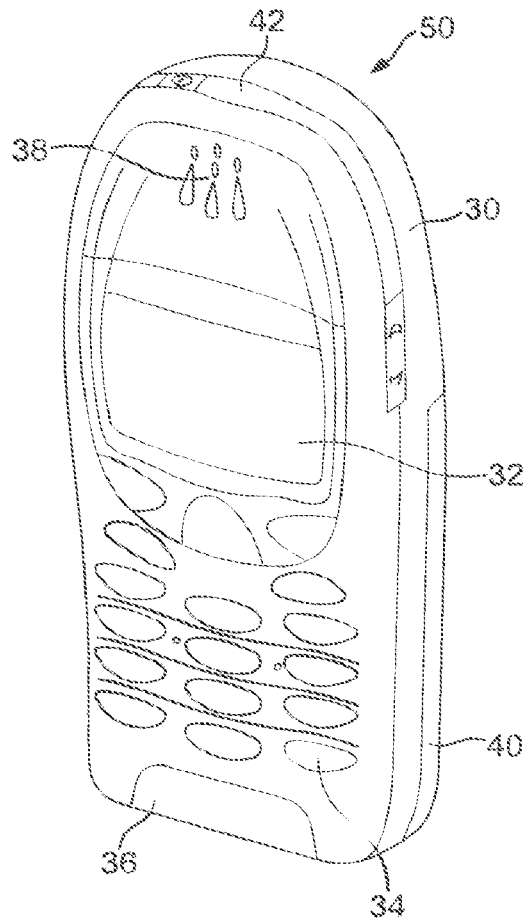
FIG. 2 shows schematically a user equipment suitable for employing some embodiments of the invention.

The following describes in further detail suitable apparatus and possible mechanisms for encoding an enhancement layer sub-picture without significantly sacrificing the coding efficiency. In this regard reference is first made to FIG. 1 which shows a schematic block diagram of an exemplary apparatus or electronic device 50, which may incorporate a codec according to an embodiment of the invention.

The electronic device 50 may for example be a mobile terminal or user equipment of a wireless communication system. However, it would be appreciated that embodiments of the invention may be implemented within any electronic device or apparatus which may require encoding and decoding or encoding or decoding video images.

The apparatus 50 may comprise a housing 30 for incorporating and protecting the device. The apparatus 50 further may comprise a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example the user interface may be implemented as a virtual keyboard or data entry system as part of a touch-sensitive display. The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery 40 (or in other embodiments of the invention the device may be powered by any suitable mobile energy device such as solar cell, fuel cell or clockwork generator). The apparatus may further comprise an infrared port 42 for short range line of sight communication to other devices. In other embodiments the apparatus 50 may further comprise any suitable short range communication solution such as for example a Bluetooth wireless connection or a USB/firewire wired connection.

The apparatus 50 may comprise a controller 56 or processor for controlling the apparatus 50. The controller 56 may be connected to memory 58 which in embodiments of the invention may store both data in the form of image and audio data and/or may also store instructions for implementation on the controller 56. The controller 56 may further be connected to codec circuitry 54 suitable for carrying out coding and decoding of audio and/or video data or assisting in coding and decoding carried out by the controller 56.

The apparatus 50 may further comprise a card reader 48 and a smart card 46, for example a UICC and UICC reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

In some embodiments of the invention, the apparatus 50 comprises a camera capable of recording or detecting individual frames which are then passed to the codec 54 or controller for processing. In other embodiments of the invention, the apparatus may receive the video image data for processing from another device prior to transmission and/or storage. In other embodiments of the invention, the apparatus 50 may receive either wirelessly or by a wired connection the image for coding/decoding.

Figure 3:
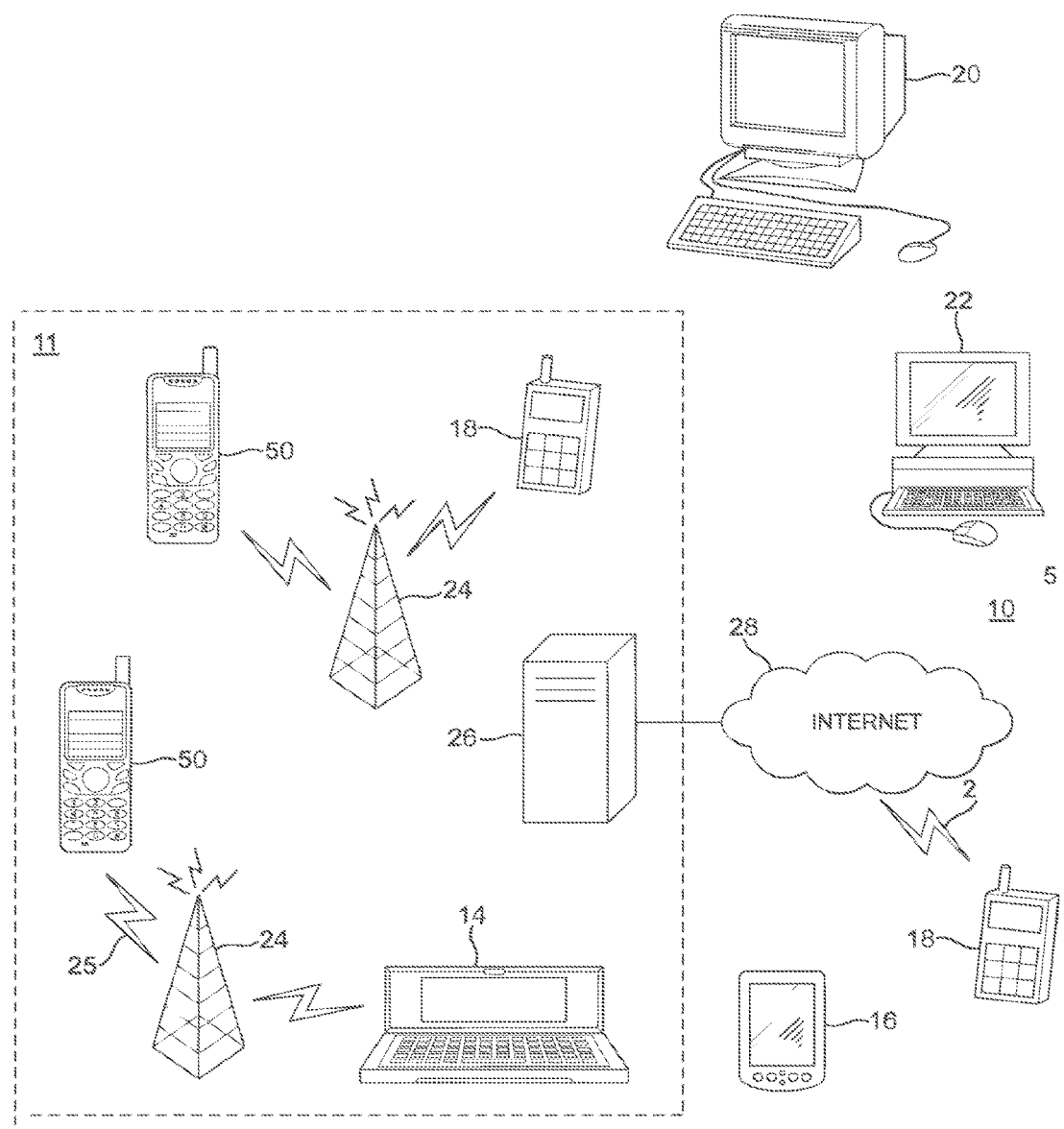
FIG. 3 further shows schematically electronic devices employing embodiments of the invention connected using wireless and wired network connections.

With respect to FIG. 3, an example of a system within which embodiments of the present invention can be utilized is shown. The system 10 comprises multiple communication devices which can communicate through one or more networks. The system 10 may comprise any combination of wired or wireless networks including, but not limited to a wireless cellular telephone network (such as a GSM, UMTS, CDMA network etc), a wireless local area network (WLAN) such as defined by any of the IEEE 802.x standards, a Bluetooth personal area network, an Ethernet local area network, a token ring local area network, a wide area network, and the Internet.

The system 10 may include both wired and wireless communication devices or apparatus 50 suitable for implementing embodiments of the invention.

For example, the system shown in FIG. 3 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

The embodiments may also be implemented in a set-top box; i.e. a digital TV receiver, which may/may not have a display or wireless capabilities, in tablets or (laptop) personal computers (PC), which may have hardware or software or combination of the encoder/decoder implementations, in various operating systems, and in chipsets, processors, DSPs and/or embedded systems offering hardware/software based coding.

Some or further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11 and any similar wireless communication technology. A communications device involved in implementing various embodiments of the present invention may communicate using various media including, but not limited to, radio, infrared, laser, cable connections, and any suitable connection.

Video codec consists of an encoder that transforms the input video into a compressed representation suited for storage/transmission and a decoder that can uncompress the compressed video representation back into a viewable form. Typically encoder discards some information in the original video sequence in order to represent the video in a more compact form (that is, at lower bitrate).

Typical hybrid video codecs, for example ITU-T H.263 and H.264, encode the video information in two phases. Firstly pixel values in a certain picture area (or "block") are predicted for example by motion compensation means (finding and indicating an area in one of the previously coded video frames that corresponds closely to the block being coded) or by spatial means (using the pixel values around the block to be coded in a specified manner).

Secondly the prediction error, i.e. the difference between the predicted block of pixels and the original block of pixels, is coded. This is typically done by transforming the difference in pixel values using a specified transform (e.g. Discrete Cosine Transform (DCT) or a variant of it), quantizing the coefficients and entropy coding the quantized coefficients. By varying the fidelity of the quantization process, encoder can control the balance between the accuracy of the pixel representation (picture quality) and size of the resulting coded video representation (file size or transmission bitrate).

Video coding is typically a two-stage process: First, a prediction of the video signal is generated based on previous coded data. Second, the residual between the predicted signal and the source signal is coded. Inter prediction, which may also be referred to as temporal prediction, motion compensation, or motion-compensated prediction, reduces temporal redundancy. In inter prediction the sources of prediction are previously decoded pictures. Intra prediction utilizes the fact that adjacent pixels within the same picture are likely to be correlated. Intra prediction can be performed in spatial or transform domain, i.e., either sample values or transform coefficients can be predicted. Intra prediction is typically exploited in intra coding, where no inter prediction is applied.

One outcome of the coding procedure is a set of coding parameters, such as motion vectors and quantized transform coefficients. Many parameters can be entropy-coded more efficiently if they are predicted first from spatially or temporally neighboring parameters. For example, a motion vector may be predicted from spatially adjacent motion vectors and only the difference relative to the motion vector predictor may be coded. Prediction of coding parameters and intra prediction may be collectively referred to as in-picture prediction.

Figure 4:
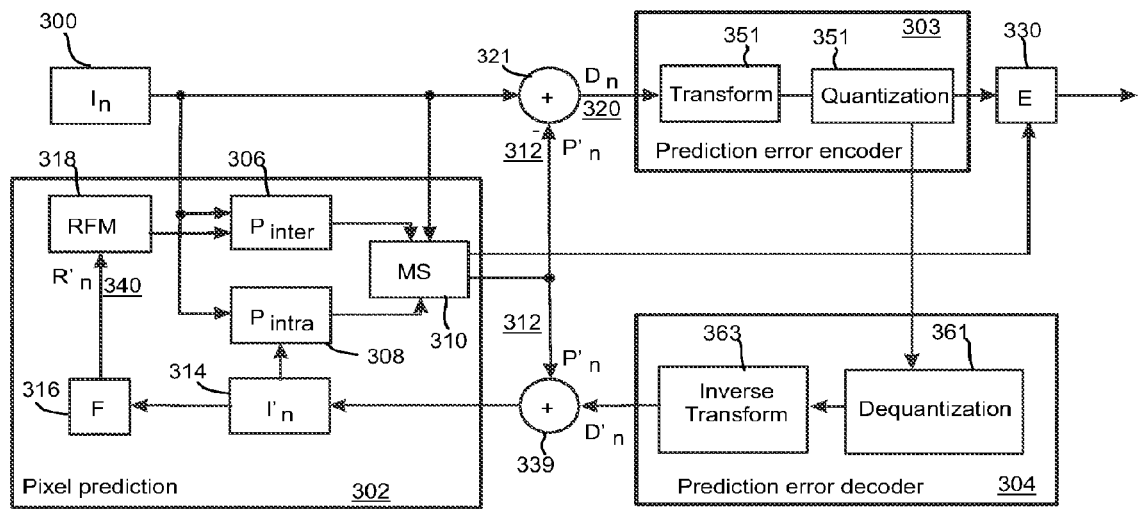
FIG. 4 shows schematically an encoder suitable for implementing some embodiments of the invention.

With respect to FIG. 4, a block diagram of a video encoder suitable for carrying out embodiments of the invention is shown. FIG. 4 shows the encoder as comprising a pixel predictor 302, prediction error encoder 303 and prediction error decoder 304. FIG. 4 also shows an embodiment of the pixel predictor 302 as comprising an inter-predictor 306, an intra-predictor 308, a mode selector 310, a filter 316, and a reference frame memory 318. The pixel predictor 302 receives the image 300 to be encoded at both the inter-predictor 306 (which determines the difference between the image and a motion compensated reference frame 318) and the intra-predictor 308 (which determines a prediction for an image block based only on the already processed parts of current frame or picture). The output of both the inter-predictor and the intra-predictor are passed to the mode selector 310. The intra-predictor 308 may have more than one intra-prediction modes. Hence, each mode may perform the intra-prediction and provide the predicted signal to the mode selector 310. The mode selector 310 also receives a copy of the image 300.

Depending on which encoding mode is selected to encode the current block, the output of the inter-predictor 306 or the output of one of the optional intra-predictor modes or the output of a surface encoder within the mode selector is passed to the output of the mode selector 310. The output of the mode selector is passed to a first summing device 321. The first summing device may subtract the output of the pixel predictor 302 from the image 300 to produce a first prediction error signal 320 which is input to the prediction error encoder 303.

The pixel predictor 302 further receives from a preliminary reconstructor 339 the combination of the prediction representation of the image block 312 and the output 338 of the prediction error decoder 304. The preliminary reconstructed image 314 may be passed to the intra-predictor 308 and to a filter 316. The filter 316 receiving the preliminary representation may filter the preliminary representation and output a final reconstructed image 340 which may be saved in a reference frame memory 318. The reference frame memory 318 may be connected to the inter-predictor 306 to be used as the reference image against which a future image 300 is compared in inter-prediction operations.

The operation of the pixel predictor 302 may be configured to carry out any known pixel prediction algorithm known in the art.

The prediction error encoder 303 comprises a transform unit 342 and a quantizer 344. The transform unit 342 transforms the first prediction error signal 320 to a transform domain. The transform is, for example, the DCT transform. The quantizer 344 quantizes the transform domain signal, e.g. the DCT coefficients, to form quantized coefficients.

The prediction error decoder 304 receives the output from the prediction error encoder 303 and performs the opposite processes of the prediction error encoder 303 to produce a decoded prediction error signal 338 which, when combined with the prediction representation of the image block 312 at the second summing device 339, produces the preliminary reconstructed image 314. The prediction error decoder may be considered to comprise a dequantizer 361, which dequantizes the quantized coefficient values, e.g. DCT coefficients, to reconstruct the transform signal and an inverse transformation unit 363, which performs the inverse transformation to the reconstructed transform signal wherein the output of the inverse transformation unit 363 contains reconstructed block(s). The prediction error decoder may also comprise a macroblock filter which may filter the reconstructed macroblock according to further decoded information and filter parameters.

The entropy encoder 330 receives the output of the prediction error encoder 303 and may perform a suitable entropy encoding/variable length encoding on the signal to provide error detection and correction capability.

The H.264/AVC standard was developed by the Joint Video Team (JVT) of the Video Coding Experts Group (VCEG) of the Telecommunications Standardization Sector of International Telecommunication Union (ITU-T) and the Moving Picture Experts Group (MPEG) of International Organisation for Standardization (ISO)/International Electrotechnical Commission (IEC). The H.264/AVC standard is published by both parent standardization organizations, and it is referred to as ITU-T Recommendation H.264 and ISO/IEC International Standard 14496-10, also known as MPEG-4 Part 10 Advanced Video Coding (AVC). There have been multiple versions of the H.264/AVC standard, each integrating new extensions or features to the specification. These extensions include Scalable Video Coding (SVC) and Multiview Video Coding (MVC). There is a currently ongoing standardization project of High Efficiency Video Coding (HEVC) by the Joint Collaborative Team-Video Coding (JCT-VC) of VCEG and MPEG.

Some key definitions, bitstream and coding structures, and concepts of H.264/AVC and HEVC are described in this section as an example of a video encoder, decoder, encoding method, decoding method, and a bitstream structure, wherein the embodiments may be implemented. Some of the key definitions, bitstream and coding structures, and concepts of H.264/AVC are the same as in a draft HEVC standard—hence, they are described below jointly. The aspects of the invention are not limited to H.264/AVC or HEVC, but rather the description is given for one possible basis on top of which the invention may be partly or fully realized.

Similarly to many earlier video coding standards, the bitstream syntax and semantics as well as the decoding process for error-free bitstreams are specified in H.264/AVC and HEVC. The encoding process is not specified, but encoders must generate conforming bitstreams. Bitstream and decoder conformance can be verified with the Hypothetical Reference Decoder (HRD). The standards contain coding tools that help in coping with transmission errors and losses, but the use of the tools in encoding is optional and no decoding process has been specified for erroneous bitstreams.

In the description of existing standards as well as in the description of example embodiments, a syntax element may be defined as an element of data represented in the bitstream. A syntax structure may be defined as zero or more syntax elements present together in the bitstream in a specified order.

A profile may be defined as a subset of the entire bitstream syntax that is specified by a decoding/coding standard or specification. Within the bounds imposed by the syntax of a given profile it is still possible to require a very large variation in the performance of encoders and decoders depending upon the values taken by syntax elements in the bitstream such as the specified size of the decoded pictures. In many applications, it might be neither practical nor economic to implement a decoder capable of dealing with all hypothetical uses of the syntax within a particular profile. In order to deal with this issue, levels may be used. A level may be defined as a specified set of constraints imposed on values of the syntax elements in the bitstream and variables specified in a decoding/coding standard or specification. These constraints may be simple limits on values. Alternatively or in addition, they may take the form of constraints on arithmetic combinations of values (e.g., picture width multiplied by picture height multiplied by number of pictures decoded per second). Other means for specifying constraints for levels may also be used. Some of the constraints specified in a level may for example relate to the maximum picture size, maximum bitrate and maximum data rate in terms of coding units, such as macroblocks, per a time period, such as a second. The same set of levels may be defined for all profiles. It may be preferable for example to increase interoperability of terminals implementing different profiles that most or all aspects of the definition of each level may be common across different profiles.

The elementary unit for the input to an H.264/AVC or HEVC encoder and the output of an H.264/AVC or HEVC decoder, respectively, is a picture. In H.264/AVC and HEVC, a picture may either be a frame or a field. A frame comprises a matrix of luma samples and corresponding chroma samples. A field is a set of alternate sample rows of a frame and may be used as encoder input, when the source signal is interlaced. Chroma pictures may be subsampled when compared to luma pictures. For example, in the 4:2:0 sampling pattern the spatial resolution of chroma pictures is half of that of the luma picture along both coordinate axes.

In H.264/AVC, a macroblock is a 16×16 block of luma samples and the corresponding blocks of chroma samples. For example, in the 4:2:0 sampling pattern, a macroblock contains one 8×8 block of chroma samples per each chroma component. In H.264/AVC, a picture is partitioned to one or more slice groups, and a slice group contains one or more slices. In H.264/AVC, a slice consists of an integer number of macroblocks ordered consecutively in the raster scan within a particular slice group.

In some video codecs, such as High Efficiency Video Coding (HEVC) codec, video pictures are divided into coding units (CU) covering the area of the picture. A CU consists of one or more prediction units (PU) defining the prediction process for the samples within the CU and one or more transform units (TU) defining the prediction error coding process for the samples in the said CU. Typically, a CU consists of a square block of samples with a size selectable from a predefined set of possible CU sizes. A CU with the maximum allowed size is typically named as LCU (largest coding unit) and the video picture is divided into non-overlapping LCUs. An LCU can be further split into a combination of smaller CUs, e.g. by recursively splitting the LCU and resultant CUs. Each resulting CU typically has at least one PU and at least one TU associated with it. Each PU and TU can be further split into smaller PUs and TUs in order to increase granularity of the prediction and prediction error coding processes, respectively. Each PU has prediction information associated with it defining what kind of a prediction is to be applied for the pixels within that PU (e.g. motion vector information for inter predicted PUs and intra prediction directionality information for intra predicted PUs).

The directionality of a prediction mode, i.e. the prediction direction to be applied in a particular prediction mode, may be vertical, horizontal, diagonal. For example, in the current HEVC draft codec, unified intra prediction provides up to 34 directional prediction modes, depending on the size of Pus, and each of the intra prediction modes has a prediction direction assigned to it.

Similarly each TU is associated with information describing the prediction error decoding process for the samples within the said TU (including e.g. DCT coefficient information). It is typically signalled at CU level whether prediction error coding is applied or not for each CU.

In the case there is no prediction error residual associated with the CU, it can be considered there are no TUs for the said CU. The division of the image into CUs, and division of CUs into PUs and TUs is typically signalled in the bitstream allowing the decoder to reproduce the intended structure of these units.

Figure 13:
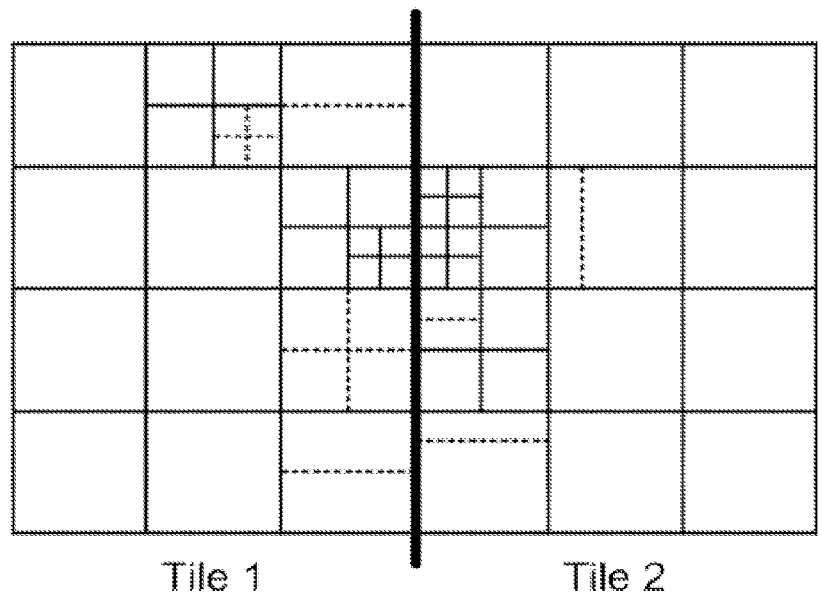
FIG. 13 shows an example of a picture consisting of two tiles.

In a draft HEVC standard, a picture can be partitioned in tiles, which are rectangular and contain an integer number of LCUs. In a draft HEVC standard, the partitioning to tiles forms a regular grid, where heights and widths of tiles differ from each other by one LCU at the maximum. In a draft HEVC, a slice consists of an integer number of CUs. The CUs are scanned in the raster scan order of LCUs within tiles or within a picture, if tiles are not in use. Within an LCU, the CUs have a specific scan order. FIG. 13 shows an example of a picture consisting of two tiles partitioned into square coding units (solid lines) which have been further partitioned into rectangular prediction units (dashed lines).

The decoder reconstructs the output video by applying prediction means similar to the encoder to form a predicted representation of the pixel blocks (using the motion or spatial information created by the encoder and stored in the compressed representation) and prediction error decoding (inverse operation of the prediction error coding recovering the quantized prediction error signal in spatial pixel domain). After applying prediction and prediction error decoding means the decoder sums up the prediction and prediction error signals (pixel values) to form the output video frame. The decoder (and encoder) can also apply additional filtering means to improve the quality of the output video before passing it for display and/or storing it as prediction reference for the forthcoming frames in the video sequence.

In typical video codecs the motion information is indicated with motion vectors associated with each motion compensated image block. Each of these motion vectors represents the displacement of the image block in the picture to be coded (in the encoder side) or decoded (in the decoder side) and the prediction source block in one of the previously coded or decoded pictures. In order to represent motion vectors efficiently those are typically coded differentially with respect to block specific predicted motion vectors. In typical video codecs the predicted motion vectors are created in a predefined way, for example calculating the median of the encoded or decoded motion vectors of the adjacent blocks. Another way to create motion vector predictions, sometimes referred to as advanced motion vector prediction (AMVP), is to generate a list of candidate predictions from adjacent blocks and/or co-located blocks in temporal reference pictures and signalling the chosen candidate as the motion vector predictor. In addition to predicting the motion vector values, the reference index of previously coded/decoded picture can be predicted. The reference index is typically predicted from adjacent blocks and/or or co-located blocks in temporal reference picture. Moreover, typical high efficiency video codecs employ an additional motion information coding/decoding mechanism, often called merging/merge mode, where all the motion field information, which includes motion vector and corresponding reference picture index for each available reference picture list, is predicted and used without any modification/correction. Similarly, predicting the motion field information is carried out using the motion field information of adjacent blocks and/or co-located blocks in temporal reference pictures and the used motion field information is signalled among a list of motion field candidate list filled with motion field information of available adjacent/co-located blocks.

In typical video codecs the prediction residual after motion compensation is first transformed with a transform kernel (like DCT) and then coded. The reason for this is that often there still exists some correlation among the residual and transform can in many cases help reduce this correlation and provide more efficient coding.

Typical video encoders utilize Lagrangian cost functions to find optimal coding modes, e.g. the desired Macroblock mode and associated motion vectors. This kind of cost function uses a weighting factor λ to tie together the (exact or estimated) image distortion due to lossy coding methods and the (exact or estimated) amount of information that is required to represent the pixel values in an image area:

$$C = D + \lambda R, \quad (1)$$

where C is the Lagrangian cost to be minimized, D is the image distortion (e.g. Mean Squared Error) with the mode and motion vectors considered, and R the number of bits needed to represent the required data to reconstruct the image block in the decoder (including the amount of data to represent the candidate motion vectors).

Video coding standards and specifications may allow encoders to divide a coded picture to coded slices or alike. In-picture prediction is typically disabled across slice boundaries. Thus, slices can be regarded as a way to split a coded picture to independently decodable pieces. In H.264/AVC and HEVC, in-picture prediction may be disabled across slice boundaries. Thus, slices can be regarded as a way to split a coded picture into independently decodable pieces, and slices are therefore often regarded as elementary units for transmission. In many cases, encoders may indicate in the bitstream which types of in-picture prediction are turned off across slice boundaries, and the decoder operation takes this information into account for example when concluding which prediction sources are available. For example, samples from a neighboring macroblock or CU may be regarded as unavailable for intra prediction, if the neighboring macroblock or CU resides in a different slice.

Coded slices can be categorized into three classes: raster-scan-order slices, rectangular slices, and flexible slices.

A raster-scan-order-slice is a coded segment that consists of consecutive macroblocks or alike in raster scan order. For example, video packets of MPEG-4 Part 2 and groups of macroblocks (GOBs) starting with a non-empty GOB header in H.263 are examples of raster-scan-order slices.

A rectangular slice is a coded segment that consists of a rectangular area of macroblocks or alike. A rectangular slice may be higher than one macroblock or alike row and narrower than the entire picture width. H.263 includes an optional rectangular slice submode, and H.261 GOBs can also be considered as rectangular slices.

A flexible slice can contain any pre-defined macroblock (or alike) locations. The H.264/AVC codec allows grouping of macroblocks to more than one slice groups. A slice group can contain any macroblock locations, including non-adjacent macroblock locations. A slice in some profiles of H.264/AVC consists of at least one macroblock within a particular slice group in raster scan order.

The elementary unit for the output of an H.264/AVC or HEVC encoder and the input of an H.264/AVC or HEVC decoder, respectively, is a Network Abstraction Layer (NAL) unit. For transport over packet-oriented networks or storage into structured files, NAL units may be encapsulated into packets or similar structures. A bytestream format has been specified in H.264/AVC and HEVC for transmission or storage environments that do not provide framing structures. The bytestream format separates NAL units from each other by attaching a start code in front of each NAL unit. To avoid false detection of NAL unit boundaries, encoders run a byte-oriented start code emulation prevention algorithm, which adds an emulation prevention byte to the NAL unit payload if a start code would have occurred otherwise. In order to enable straightforward gateway operation between packet- and stream-oriented systems, start code emulation prevention may always be performed regardless of whether the bytestream format is in use or not. A NAL unit may be defined as a syntax structure containing an indication of the type of data to follow and bytes containing that data in the form of an RBSP interspersed as necessary with emulation prevention bytes. A raw byte sequence payload (RBSP) may be defined as a syntax structure containing an integer number of bytes that is encapsulated in a NAL unit. An RBSP is either empty or has the form of a string of data bits containing syntax elements followed by an RBSP stop bit and followed by zero or more subsequent bits equal to 0.

NAL units consist of a header and payload. In H.264/AVC and HEVC, the NAL unit header indicates the type of the NAL unit and may indicate whether a coded slice contained in the NAL unit is a part of a reference picture or a non-reference picture.

H.264/AVC NAL unit header includes a 2-bit nal_ref_idc syntax element, which when equal to 0 indicates that a coded slice contained in the NAL unit is a part of a non-reference picture and when greater than 0 indicates that a coded slice contained in the NAL unit is a part of a reference picture. A draft HEVC standard includes a 1-bit nal_ref_idc syntax element, also known as nal_ref_flag, which when equal to 0 indicates that a coded slice contained in the NAL unit is a part of a non-reference picture and when equal to 1 indicates that a coded slice contained in the NAL unit is a part of a reference picture. The header for SVC and MVC NAL units may additionally contain various indications related to the scalability and multiview hierarchy.

In a draft HEVC standard, a two-byte NAL unit header is used for all specified NAL unit types. The first byte of the NAL unit header contains one reserved bit, a one-bit indication nal_ref_flag primarily indicating whether the picture carried in this access unit is a reference picture or a non-reference picture, and a six-bit NAL unit type indication. The second byte of the NAL unit header includes a three-bit temporal_id indication for temporal level and a five-bit reserved field (called reserved_one_5 bits) required to have a value equal to 1 in a draft HEVC standard. The temporal_id syntax element may be regarded as a temporal identifier for the NAL unit.

The five-bit reserved field is expected to be used by extensions such as a future scalable and 3D video extension. It is expected that these five bits would carry information on the scalability hierarchy, such as quality_id or similar, dependency_id or similar, any other type of layer identifier, view order index or similar, view identifier, an identifier similar to priority_id of SVC indicating a valid sub-bitstream extraction if all NAL units greater than a specific identifier value are removed from the bitstream. Without loss of generality, in some example embodiments a variable LayerId is derived from the value of reserved_one_5 bits, which may also be referred to as layer_id_plus1, for example as follows: LayerId=reserved_one_5 bits−1.

In a later draft HEVC standard, a two-byte NAL unit header is used for all specified NAL unit types. The NAL unit header contains one reserved bit, a six-bit NAL unit type indication, a six-bit reserved field (called reserved zero_6 bits) and a three-bit temporal_id_plus1 indication for temporal level. The temporal_id_plus1 syntax element may be regarded as a temporal identifier for the NAL unit, and a zero-based TemporalId variable may be derived as follows: TemporalId=temporal_id_plus1−1. TemporalId equal to 0 corresponds to the lowest temporal level. The value of temporal_id_plus1 is required to be non-zero in order to avoid start code emulation involving the two NAL unit header bytes. Without loss of generality, in some example embodiments a variable LayerId is derived from the value of reserved_zero_6 bits for example as follows: LayerId=reserved_zero_6 bits.

NAL units can be categorized into Video Coding Layer (VCL) NAL units and non-VCL NAL units. VCL NAL units are typically coded slice NAL units. In H.264/AVC, coded slice NAL units contain syntax elements representing one or more coded macroblocks, each of which corresponds to a block of samples in the uncompressed picture. In HEVC, coded slice NAL units contain syntax elements representing one or more CU. In H.264/AVC and HEVC a coded slice NAL unit can be indicated to be a coded slice in an Instantaneous Decoding Refresh (IDR) picture or coded slice in a non-IDR picture. In HEVC, a coded slice NAL unit can be indicated to be a coded slice in a Clean Decoding Refresh (CDR) picture (which may also be referred to as a Clean Random Access picture or a CRA picture).

A non-VCL NAL unit may be for example one of the following types: a sequence parameter set, a picture parameter set, a supplemental enhancement information (SEI) NAL unit, an access unit delimiter, an end of sequence NAL unit, an end of stream NAL unit, or a filler data NAL unit. Parameter sets may be needed for the reconstruction of decoded pictures, whereas many of the other non-VCL NAL units are not necessary for the reconstruction of decoded sample values.

Parameters that remain unchanged through a coded video sequence may be included in a sequence parameter set. In addition to the parameters that may be needed by the decoding process, the sequence parameter set may optionally contain video usability information (VUI), which includes parameters that may be important for buffering, picture output timing, rendering, and resource reservation. There are three NAL units specified in H.264/AVC to carry sequence parameter sets: the sequence parameter set NAL unit containing all the data for H.264/AVC VCL NAL units in the sequence, the sequence parameter set extension NAL unit containing the data for auxiliary coded pictures, and the subset sequence parameter set for MVC and SVC VCL NAL units. In a draft HEVC standard a sequence parameter set RBSP includes parameters that can be referred to by one or more picture parameter set RBSPs or one or more SEI NAL units containing a buffering period SEI message. A picture parameter set contains such parameters that are likely to be unchanged in several coded pictures. A picture parameter set RBSP may include parameters that can be referred to by the coded slice NAL units of one or more coded pictures.

In a draft HEVC, there is also a third type of parameter sets, here referred to as an Adaptation Parameter Set (APS), which includes parameters that are likely to be unchanged in several coded slices but may change for example for each picture or each few pictures. In a draft HEVC, the APS syntax structure includes parameters or syntax elements related to quantization matrices (QM), adaptive sample offset (SAO), adaptive loop filtering (ALF), and deblocking filtering. In a draft HEVC, an APS is a NAL unit and coded without reference or prediction from any other NAL unit. An identifier, referred to as aps_id syntax element, is included in APS NAL unit, and included and used in the slice header to refer to a particular APS. In another draft HEVC standard, an APS syntax structure only contains ALF parameters. In a draft HEVC standard, an adaptation parameter set RBSP includes parameters that can be referred to by the coded slice NAL units of one or more coded pictures when at least one of sample_adaptive_offset_enabled_flag or adaptive_loop_filter_enabled_flag are equal to 1.

A draft HEVC standard also includes a fourth type of a parameter set, called a video parameter set (VPS), which was proposed for example in document JCTVC-H0388 (http://phenix.int-evry.fr/jct/doc_end_user/documents/8_San%20Jose/wg11/JCTVC-H0388-v4.zip). A video parameter set RBSP may include parameters that can be referred to by one or more sequence parameter set RBSPs.

The relationship and hierarchy between video parameter set (VPS), sequence parameter set (SPS), and picture parameter set (PPS) may be described as follows. VPS resides one level above SPS in the parameter set hierarchy and in the context of scalability and/or 3DV. VPS may include parameters that are common for all slices across all (scalability or view) layers in the entire coded video sequence. SPS includes the parameters that are common for all slices in a particular (scalability or view) layer in the entire coded video sequence, and may be shared by multiple (scalability or view) layers. PPS includes the parameters that are common for all slices in a particular layer representation (the representation of one scalability or view layer in one access unit) and are likely to be shared by all slices in multiple layer representations.

VPS may provide information about the dependency relationships of the layers in a bitstream, as well as many other information that are applicable to all slices across all (scalability or view) layers in the entire coded video sequence. In a scalable extension of HEVC, VPS may for example include a mapping of the LayerId value derived from the NAL unit header to one or more scalability dimension values, for example correspond to dependency_id, quality_id, view_id, and depth_flag for the layer defined similarly to SVC and MVC. VPS may include profile and level information for one or more layers as well as the profile and/or level for one or more temporal sub-layers (consisting of VCL NAL units at and below certain temporal_id values) of a layer representation.

In a draft HEVC standard, a coded slice NAL unit can be indicated to be one of the following types.

TABLE 1

| nal_unit_type | Name of nal_unit_type | Content of NAL unit and RBSP syntax structure |
|---|---|---|
| 1, 2 | TRAIL_R, TRAIL_N | Coded slice of a non-TSA, non-STSA trailing picture slice_layer_rbsp( ) |
| 3, 4 | TSA_R, TSA_N | Coded slice of a TSA picture slice_layer_rbsp( ) |
| 5, 6 | STSA_R, STSA_N | Coded slice of an STSA picture slice_layer_rbsp( ) |
| 7, 8, 9 | BLA_W_TFD BLA_W_DLP BLA_N_LP | Coded slice of a BLA picture slice_layer_rbsp( ) |
| 10, 11 | IDR_W_LP IDR_N_LP | Coded slice of an IDR picture slice_layer_rbsp( ) |
| 12 | CRA_NUT | Coded slice of a CRA picture slice_layer_rbsp( ) |
| 13 | DLP_NUT | Coded slice of a DLP picture slice_layer_rbsp( ) |
| 14 | TFD_NUT | Coded slice of a TFD picture slice_layer_rbsp( ) |

In a draft HEVC standard, abbreviations for picture types may be defined as follows: Broken Link Access (BLA), Clean Random Access (CRA), Decodable Leading Picture (DLP), Instantaneous Decoding Refresh (IDR), Random Access Point (RAP), Step-wise Temporal Sub-layer Access (STSA), Tagged For Discard (TFD), Temporal Sub-layer Access (TSA).

A BLA picture having nal_unit_type equal to BLA_W_TFD is allowed to have associated TFD pictures present in the bitstream. A BLA picture having nal_unit_type equal to BLA_W_DLP does not have associated TFD pictures present in the bitstream, but may have associated DLP pictures in the bitstream. A BLA picture having nal_unit_type equal to BLA_N_LP does not have associated leading pictures present in the bitstream.

An IDR picture having nal_unit_type equal to IDR_N_LP does not have associated leading pictures present in the bitstream. An IDR picture having nal_unit_type equal to IDR_W_LP does not have associated TFD pictures present in the bitstream, but may have associated DLP pictures in the bitstream.

When the value of nal_unit_type is equal to TRAIL_N, TSA_N or STSA_N, the decoded picture is not used as reference for any other picture of the same temporal sub-layer. That is, in a draft HEVC standard, when the value of nal_unit_type is equal to TRAIL_N, TSA_N or STSA_N, the decoded picture is not included in any of RefPicSetStCurrBefore, RefPicSetStCurrAfter and RefPicSetLtCurr of any picture with the same value of TemporalId. A coded picture with nal_unit_type equal to TRAIL_N, TSA_N or STSA_N may be discarded without affecting the decodability of other pictures with the same value of TemporalId.

In the table 1 above, RAP pictures are those having nal_unit_type within the range of 7 to 12, inclusive. Each picture, other than the first picture in the bitstream, is considered to be associated with the previous RAP picture in decoding order. A leading picture may be defined as a picture that precedes the associated RAP picture in output order. Any picture that is a leading picture has nal_unit_type equal to DLP_NUT or TFD_NUT. A trailing picture may be defined as a picture that follows the associated RAP picture in output order. Any picture that is a trailing picture does not have nal_unit_type equal to DLP_NUT or TFD_NUT. Any picture that is a leading picture may be constrained to precede, in decoding order, all trailing pictures that are associated with the same RAP picture. No TFD pictures are present in the bitstream that are associated with a BLA picture having nal_unit_type equal to BLA_W_DLP or BLA_N_LP. No DLP pictures are present in the bitstream that are associated with a BLA picture having nal_unit_type equal to BLA_N_LP or that are associated with an IDR picture having nal_unit_type equal to IDR_N_LP. Any TFD picture associated with a CRA or BLA picture may be constrained to precede any DLP picture associated with the CRA or BLA picture in output order. Any TFD picture associated with a CRA picture may be constrained to follow, in output order, any another RAP picture that precedes the CRA picture in decoding order.

Another means of describing picture types of a draft HEVC standard is provided next. As illustrated in the table below, picture types can be classified into the following groups in HEVC: a) random access point (RAP) pictures, b) leading pictures, c) sub-layer access pictures, and d) pictures that do not fall into the three mentioned groups. The picture types and their sub-types as described in the table below are identified by the NAL unit type in HEVC. RAP picture types include IDR picture, BLA picture, and CRA picture, and can be further characterized based on the leading pictures associated with them as indicated in the table 2 below.

TABLE 2

| a) Random access point pictures | | |
|---|---|---|
| IDR | Instantaneous decoding refresh | without associated leading pictures may have associated leading pictures |
| BLA | Broken link access | without associated leading pictures may have associated DLP pictures but without associated TFD pictures may have associated DLP and TFD pictures |
| CRA | Clean random access | may have associated leading pictures |
| b) Leading pictures | | |
| DLP | Decodable leading picture | |
| TFD | Tagged for discard | |
| c) Temporal sub-layer access pictures | | |
| TSA | Temporal sub-layer access | not used for reference in the same sub-layer may be used for reference in the same sub-layer |
| STSA | Step-wise temporal sub-layer access | not used for reference in the same sub-layer may be used for reference in the same sub-layer |
| d) Picture that is not RAP, leading or temporal sub-layer access picture | | |
| | | not used for reference in the same sub-layer may be used for reference in the same sub-layer |

CRA pictures in HEVC allows pictures that follow the CRA picture in decoding order but precede it in output order to use pictures decoded before the CRA picture as reference and still allow similar clean random access functionality as an IDR picture. Pictures that follow a CRA picture in both decoding and output order are decodable if random access is performed at the CRA picture, and hence clean random access is achieved.

Leading pictures of a CRA picture that do not refer to any picture preceding the CRA picture in decoding order can be correctly decoded when the decoding starts from the CRA picture and are therefore DLP pictures. In contrast, a TFD picture cannot be correctly decoded when decoding starts from a CRA picture associated with the TFD picture (while the TFD picture could be correctly decoded if the decoding had started from a RAP picture before the current CRA picture). Hence TFD pictures associated with a CRA are typically discarded when the decoding starts from the CRA picture.

When a part of a bitstream starting from a CRA picture is included in another bitstream, the TFD pictures associated with the CRA picture cannot be decoded, because some of their reference pictures are not present in the combined bitstream. To make such splicing operation straightforward, the NAL unit type of the CRA picture can be changed to indicate that it is a BLA picture. The TFD pictures associated with a BLA picture are typically not correctly decodable hence should not be output/displayed. The TFD pictures associated with a BLA picture may be omitted from decoding.

In HEVC there are two picture types, the TSA and STSA picture types that can be used to indicate temporal sub-layer switching points. If temporal sub-layers with TemporalId up to N had been decoded until the TSA or STSA picture (exclusive) and the TSA or STSA picture has TemporalId equal to N+1, the TSA or STSA picture enables decoding of all subsequent pictures (in decoding order) having TemporalId equal to N+1. The TSA picture type imposes restrictions on the TSA picture itself and all pictures in the same sub-layer that follow the TSA picture in decoding order. None of these pictures is allowed to use inter prediction from any picture in the same sub-layer that precedes the TSA picture in decoding order. The TSA definition further imposes restrictions on the pictures in higher sub-layers that follow the TSA picture in decoding order. None of these pictures is allowed to reference a picture that precedes the TSA picture in decoding order if that picture belongs to the same or higher sub-layer as the TSA picture. TSA pictures have TemporalId greater than 0. The STSA is similar to the TSA picture but does not impose restrictions on the pictures in higher sub-layers that follow the STSA picture in decoding order and hence enable up-switching only onto the sub-layer where the STSA picture resides.

H.264/AVC and HEVC syntax allows many instances of parameter sets, and each instance is identified with a unique identifier. In order to limit the memory usage needed for parameter sets, the value range for parameter set identifiers has been limited. In H.264/AVC and a draft HEVC standard, each slice header includes the identifier of the picture parameter set that is active for the decoding of the picture that contains the slice, and each picture parameter set contains the identifier of the active sequence parameter set. In a HEVC standard, a slice header additionally contains an APS identifier. Consequently, the transmission of picture and sequence parameter sets does not have to be accurately synchronized with the transmission of slices. Instead, it is sufficient that the active sequence and picture parameter sets are received at any moment before they are referenced, which allows transmission of parameter sets "out-of-band" using a more reliable transmission mechanism compared to the protocols used for the slice data. For example, parameter sets can be included as a parameter in the session description for Real-time Transport Protocol (RTP) sessions. If parameter sets are transmitted in-band, they can be repeated to improve error robustness.

A parameter set may be activated by a reference from a slice or from another active parameter set or in some cases from another syntax structure such as a buffering period SEI message.

A SEI NAL unit may contain one or more SEI messages, which are not required for the decoding of output pictures but may assist in related processes, such as picture output timing, rendering, error detection, error concealment, and resource reservation. Several SEI messages are specified in H.264/AVC and HEVC, and the user data SEI messages enable organizations and companies to specify SEI messages for their own use. H.264/AVC and HEVC contain the syntax and semantics for the specified SEI messages but no process for handling the messages in the recipient is defined. Consequently, encoders are required to follow the H.264/AVC standard or the HEVC standard when they create SEI messages, and decoders conforming to the H.264/AVC standard or the HEVC standard, respectively, are not required to process SEI messages for output order conformance. One of the reasons to include the syntax and semantics of SEI messages in H.264/AVC and HEVC is to allow different system specifications to interpret the supplemental information identically and hence interoperate. It is intended that system specifications can require the use of particular SEI messages both in the encoding end and in the decoding end, and additionally the process for handling particular SEI messages in the recipient can be specified.

A coded picture is a coded representation of a picture. A coded picture in H.264/AVC comprises the VCL NAL units that are required for the decoding of the picture. In H.264/AVC, a coded picture can be a primary coded picture or a redundant coded picture. A primary coded picture is used in the decoding process of valid bitstreams, whereas a redundant coded picture is a redundant representation that should only be decoded when the primary coded picture cannot be successfully decoded. In a draft HEVC, no redundant coded picture has been specified.

In H.264/AVC and HEVC, an access unit comprises a primary coded picture and those NAL units that are associated with it. In H.264/AVC, the appearance order of NAL units within an access unit is constrained as follows. An optional access unit delimiter NAL unit may indicate the start of an access unit. It is followed by zero or more SEI NAL units. The coded slices of the primary coded picture appear next. In H.264/AVC, the coded slice of the primary coded picture may be followed by coded slices for zero or more redundant coded pictures. A redundant coded picture is a coded representation of a picture or a part of a picture. A redundant coded picture may be decoded if the primary coded picture is not received by the decoder for example due to a loss in transmission or a corruption in physical storage medium.

In H.264/AVC, an access unit may also include an auxiliary coded picture, which is a picture that supplements the primary coded picture and may be used for example in the display process. An auxiliary coded picture may for example be used as an alpha channel or alpha plane specifying the transparency level of the samples in the decoded pictures. An alpha channel or plane may be used in a layered composition or rendering system, where the output picture is formed by overlaying pictures being at least partly transparent on top of each other. An auxiliary coded picture has the same syntactic and semantic restrictions as a monochrome redundant coded picture. In H.264/AVC, an auxiliary coded picture contains the same number of macroblocks as the primary coded picture.

A coded video sequence is defined to be a sequence of consecutive access units in decoding order from an IDR access unit, inclusive, to the next IDR access unit, exclusive, or to the end of the bitstream, whichever appears earlier.

A group of pictures (GOP) and its characteristics may be defined as follows. A GOP can be decoded regardless of whether any previous pictures were decoded. An open GOP is such a group of pictures in which pictures preceding the initial intra picture in output order might not be correctly decodable when the decoding starts from the initial intra picture of the open GOP. In other words, pictures of an open GOP may refer (in inter prediction) to pictures belonging to a previous GOP. An H.264/AVC decoder can recognize an intra picture starting an open GOP from the recovery point SEI message in an H.264/AVC bitstream. An HEVC decoder can recognize an intra picture starting an open GOP, because a specific NAL unit type, CRA NAL unit type, is used for its coded slices. A closed GOP is such a group of pictures in which all pictures can be correctly decoded when the decoding starts from the initial intra picture of the closed GOP. In other words, no picture in a closed GOP refers to any pictures in previous GOPs. In H.264/AVC, a closed GOP starts from an IDR access unit. In HEVC, a closed GOP starts from an IDR or BLA access unit. As a result, closed GOP structure has more error resilience potential in comparison to the open GOP structure, however at the cost of possible reduction in the compression efficiency. Open GOP coding structure is potentially more efficient in the compression, due to a larger flexibility in selection of reference pictures.

The bitstream syntax of H.264/AVC and HEVC indicates whether a particular picture is a reference picture for inter prediction of any other picture. Pictures of any coding type (I, P, B) can be reference pictures or non-reference pictures in H.264/AVC and HEVC. The NAL unit header indicates the type of the NAL unit and whether a coded slice contained in the NAL unit is a part of a reference picture or a non-reference picture.

H.264/AVC specifies the process for decoded reference picture marking in order to control the memory consumption in the decoder. The maximum number of reference pictures used for inter prediction, referred to as M, is determined in the sequence parameter set. When a reference picture is decoded, it is marked as "used for reference". If the decoding of the reference picture caused more than M pictures marked as "used for reference", at least one picture is marked as "unused for reference". There are two types of operation for decoded reference picture marking: adaptive memory control and sliding window. The operation mode for decoded reference picture marking is selected on picture basis. The adaptive memory control enables explicit signaling which pictures are marked as "unused for reference" and may also assign long-term indices to short-term reference pictures. The adaptive memory control may require the presence of memory management control operation (MMCO) parameters in the bitstream. MMCO parameters may be included in a decoded reference picture marking syntax structure. If the sliding window operation mode is in use and there are M pictures marked as "used for reference", the short-term reference picture that was the first decoded picture among those short-term reference pictures that are marked as "used for reference" is marked as "unused for reference". In other words, the sliding window operation mode results into first-in-first-out buffering operation among short-term reference pictures.

One of the memory management control operations in H.264/AVC causes all reference pictures except for the current picture to be marked as "unused for reference". An instantaneous decoding refresh (IDR) picture contains only intra-coded slices and causes a similar "reset" of reference pictures.

In a draft HEVC standard, reference picture marking syntax structures and related decoding processes are not used, but instead a reference picture set (RPS) syntax structure and decoding process are used instead for a similar purpose. A reference picture set valid or active for a picture includes all the reference pictures used as reference for the picture and all the reference pictures that are kept marked as "used for reference" for any subsequent pictures in decoding order. There are six subsets of the reference picture set, which are referred to as namely RefPicSetStCurr0, RefPicSetStCurr1, RefPicSetStFoll0, RefPicSetStFoll1, RefPicSetLtCurr, and RefPicSetLtFoll. The notation of the six subsets is as follows. "Curr" refers to reference pictures that are included in the reference picture lists of the current picture and hence may be used as inter prediction reference for the current picture. "Foll" refers to reference pictures that are not included in the reference picture lists of the current picture but may be used in subsequent pictures in decoding order as reference pictures. "St" refers to short-term reference pictures, which may generally be identified through a certain number of least significant bits of their POC value. "Lt" refers to long-term reference pictures, which are specifically identified and generally have a greater difference of POC values relative to the current picture than what can be represented by the mentioned certain number of least significant bits. "0" refers to those reference pictures that have a smaller POC value than that of the current picture. "1" refers to those reference pictures that have a greater POC value than that of the current picture. RefPicSetStCurr0, RefPicSetStCurr1, RefPicSetStFoll0 and RefPicSetStFoll1 are collectively referred to as the short-term subset of the reference picture set. RefPicSetLtCurr and RefPicSetLtFoll are collectively referred to as the long-term subset of the reference picture set.

In a draft HEVC standard, a reference picture set may be specified in a sequence parameter set and taken into use in the slice header through an index to the reference picture set. A reference picture set may also be specified in a slice header. A long-term subset of a reference picture set is generally specified only in a slice header, while the short-term subsets of the same reference picture set may be specified in the picture parameter set or slice header. A reference picture set may be coded independently or may be predicted from another reference picture set (known as inter-RPS prediction). When a reference picture set is independently coded, the syntax structure includes up to three loops iterating over different types of reference pictures; short-term reference pictures with lower POC value than the current picture, short-term reference pictures with higher POC value than the current picture and long-term reference pictures. Each loop entry specifies a picture to be marked as "used for reference". In general, the picture is specified with a differential POC value. The inter-RPS prediction exploits the fact that the reference picture set of the current picture can be predicted from the reference picture set of a previously decoded picture. This is because all the reference pictures of the current picture are either reference pictures of the previous picture or the previously decoded picture itself. It is only necessary to indicate which of these pictures should be reference pictures and be used for the prediction of the current picture. In both types of reference picture set coding, a flag (used_by_curr_pic_X_flag) is additionally sent for each reference picture indicating whether the reference picture is used for reference by the current picture (included in a *Curr list) or not (included in a *Foll list). Pictures that are included in the reference picture set used by the current slice are marked as "used for reference", and pictures that are not in the reference picture set used by the current slice are marked as "unused for reference". If the current picture is an IDR picture, RefPicSetStCurr0, RefPicSetStCurr1, RefPicSetStFoll0, RefPicSetStFoll1, RefPicSetLtCurr, and RefPicSetLtFoll are all set to empty.

A Decoded Picture Buffer (DPB) may be used in the encoder and/or in the decoder. There are two reasons to buffer decoded pictures, for references in inter prediction and for reordering decoded pictures into output order. As H.264/AVC and HEVC provide a great deal of flexibility for both reference picture marking and output reordering, separate buffers for reference picture buffering and output picture buffering may waste memory resources. Hence, the DPB may include a unified decoded picture buffering process for reference pictures and output reordering. A decoded picture may be removed from the DPB when it is no longer used as a reference and is not needed for output.

In many coding modes of H.264/AVC and HEVC, the reference picture for inter prediction is indicated with an index to a reference picture list. The index may be coded with variable length coding, which usually causes a smaller index to have a shorter value for the corresponding syntax element. In H.264/AVC and HEVC, two reference picture lists (reference picture list 0 and reference picture list 1) are generated for each bi-predictive (B) slice, and one reference picture list (reference picture list 0) is formed for each inter-coded (P) slice. In addition, for a B slice in a draft HEVC standard, a combined list (List C) is constructed after the final reference picture lists (List 0 and List 1) have been constructed. The combined list may be used for uni-prediction (also known as uni-directional prediction) within B slices.

A reference picture list, such as reference picture list 0 and reference picture list 1, is typically constructed in two steps: First, an initial reference picture list is generated. The initial reference picture list may be generated for example on the basis of frame_num, POC, temporal_id, or information on the prediction hierarchy such as GOP structure, or any combination thereof. Second, the initial reference picture list may be reordered by reference picture list reordering (RPLR) commands, also known as reference picture list modification syntax structure, which may be contained in slice headers. The RPLR commands indicate the pictures that are ordered to the beginning of the respective reference picture list. This second step may also be referred to as the reference picture list modification process, and the RPLR commands may be included in a reference picture list modification syntax structure. If reference picture sets are used, the reference picture list 0 may be initialized to contain RefPicSetStCurr0 first, followed by RefPicSetStCurr1, followed by RefPicSetLtCurr. Reference picture list 1 may be initialized to contain RefPicSetStCurr1 first, followed by RefPicSetStCurr0. The initial reference picture lists may be modified through the reference picture list modification syntax structure, where pictures in the initial reference picture lists may be identified through an entry index to the list.

Many coding standards allow the use of multiple reference pictures for inter prediction. Many coding standards, such as H.264/AVC and HEVC, include syntax structures in the bitstream that enable decoders to create one or more reference picture lists to be used in inter prediction when more than one reference picture may be used. A reference picture index to a reference picture list may be used to indicate which one of the multiple reference pictures is used for inter prediction for a particular block. A reference picture index or any other similar information identifying a reference picture may therefore be associated with or considered part of a motion vector. A reference picture index may be coded by an encoder into the bitstream is some inter coding modes or it may be derived (by an encoder and a decoder) for example using neighboring blocks in some other inter coding modes. In many coding modes of H.264/AVC and HEVC, the reference picture for inter prediction is indicated with an index to a reference picture list. The index may be coded with variable length coding, which usually causes a smaller index to have a shorter value for the corresponding syntax element. In H.264/AVC and HEVC, two reference picture lists (reference picture list 0 and reference picture list 1) are generated for each bi-predictive (B) slice, and one reference picture list (reference picture list 0) is formed for each inter-coded (P) slice. In addition, for a B slice in a draft HEVC standard, a combined list (List C) may be constructed after the final reference picture lists (List 0 and List 1) have been constructed. The combined list may be used for uni-prediction (also known as uni-directional prediction) within B slices.

Figure 5:
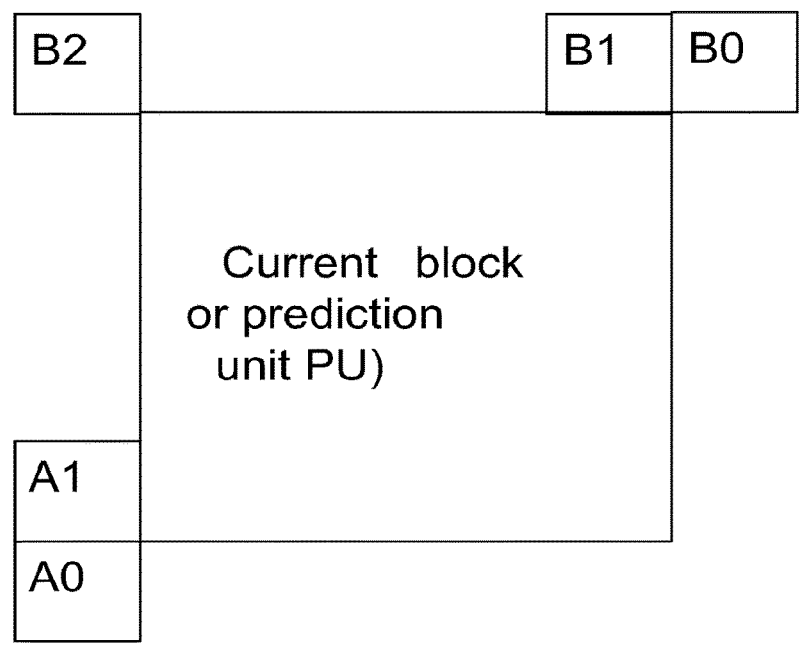
FIG. 5 shows an example of determining motion prediction candidates in an AVMP process.

AMVP may operate for example as follows, while other similar realizations of AMVP are also possible for example with different candidate position sets and candidate locations with candidate position sets. Two spatial motion vector predictors (MVPs) may be derived and a temporal motion vector predictor (TMVP) may be derived. They are selected among the positions shown in FIG. 5: three spatial MVP candidate positions located above the current prediction block (B0, B1, B2) and two on the left (A0, A1). The first motion vector predictor that is available (e.g. resides in the same slice, is inter-coded, etc.) in a pre-defined order of each candidate position set, (B0, B1, B2) or (A0, A1), may be selected to represent that prediction direction (up or left) in the motion vector competition. A reference index for TMVP may be indicated by the encoder in the slice header (e.g. as collocated_ref_idx syntax element). The motion vector obtained from the co-located picture may be scaled according to the proportions of the picture order count differences of the reference picture of TMVP, the co-located picture, and the current picture. Moreover, a redundancy check may be performed among the candidates to remove identical candidates, which can lead to the inclusion of a zero MV in the candidate list. The motion vector predictor may be indicated in the bitstream for example by indicating the direction of the spatial MVP (up or left) or the selection of the TMVP candidate.

In addition to predicting the motion vector values, the reference index of previously coded/decoded picture can be predicted. The reference index may be predicted from adjacent blocks and/or from co-located blocks in a temporal reference picture.

Moreover, many high efficiency video codecs employ an additional motion information coding/decoding mechanism, often called merging/merge mode, where all the motion field information, which includes motion vector and corresponding reference picture index for each available reference picture list, is predicted and used without any modification/correction. Similarly, predicting the motion field information is carried out using the motion field information of adjacent blocks and/or co-located blocks in temporal reference pictures and the used motion field information is signalled among a list of motion field candidate list filled with motion field information of available adjacent/co-located blocks.

In a merge mode, all the motion information of a block/PU may be predicted and used without any modification/correction. The aforementioned motion information for a PU may comprise
1) The information whether 'the PU is uni-predicted using only reference picture list0' or 'the PU is uni-predicted using only reference picture list1' or 'the PU is bi-predicted using both reference picture list0 and list1'
2) Motion vector value corresponding to the reference picture list0
3) Reference picture index in the reference picture list0
4) Motion vector value corresponding to the reference picture list1
5) Reference picture index in the reference picture list1.

Similarly, predicting the motion information is carried out using the motion information of adjacent blocks and/or co-located blocks in temporal reference pictures. Typically, a list, often called as merge list, is constructed by including motion prediction candidates associated with available adjacent/co-located blocks and the index of selected motion prediction candidate in the list is signalled. Then the motion information of the selected candidate is copied to the motion information of the current PU. When the merge mechanism is employed for a whole CU and the prediction signal for the CU is used as the reconstruction signal, i.e. prediction residual is not processed, this type of coding/decoding the CU is typically named as skip mode or merge based skip mode. In addition to the skip mode, the merge mechanism is also employed for individual PUs (not necessarily the whole CU as in skip mode) and in this case, prediction residual may be utilized to improve prediction quality. This type of prediction mode is typically named as inter-merge mode.

Scalable video coding refers to coding structure where one bitstream can contain multiple representations of the content at different bitrates, resolutions or frame rates. In these cases the receiver can extract the desired representation depending on its characteristics (e.g. resolution that matches best the display device). Alternatively, a server or a network element can extract the portions of the bitstream to be transmitted to the receiver depending on e.g. the network characteristics or processing capabilities of the receiver. A scalable bitstream typically consists of a "base layer" providing the lowest quality video available and one or more enhancement layers that enhance the video quality when received and decoded together with the lower layers. In order to improve coding efficiency for the enhancement layers, the coded representation of that layer typically depends on the lower layers. E.g. the motion and mode information of the enhancement layer can be predicted from lower layers. Similarly the pixel data of the lower layers can be used to create prediction for the enhancement layer.

In some scalable video coding schemes, a video signal can be encoded into a base layer and one or more enhancement layers. An enhancement layer may enhance the temporal resolution (i.e., the frame rate), the spatial resolution, or simply the quality of the video content represented by another layer or part thereof. Each layer together with all its dependent layers is one representation of the video signal at a certain spatial resolution, temporal resolution and quality level. In this document, we refer to a scalable layer together with all of its dependent layers as a "scalable layer representation". The portion of a scalable bitstream corresponding to a scalable layer representation can be extracted and decoded to produce a representation of the original signal at certain fidelity.

Some coding standards allow creation of scalable bit streams. A meaningful decoded representation can be produced by decoding only certain parts of a scalable bit stream. Scalable bit streams can be used for example for rate adaptation of pre-encoded unicast streams in a streaming server and for transmission of a single bit stream to terminals having different capabilities and/or with different network conditions. A list of some other use cases for scalable video coding can be found in the ISO/IEC JTC1 SC29 WG11 (MPEG) output document N5540, "Applications and Requirements for Scalable Video Coding", the $64^{th}$ MPEG meeting, Mar. 10 to 14, 2003, Pattaya, Thailand.

In some cases, data in an enhancement layer can be truncated after a certain location, or even at arbitrary positions, where each truncation position may include additional data representing increasingly enhanced visual quality. Such scalability is referred to as fine-grained (granularity) scalability (FGS).

SVC uses an inter-layer prediction mechanism, wherein certain information can be predicted from layers other than the currently reconstructed layer or the next lower layer. Information that could be inter-layer predicted includes intra texture, motion and residual data. Inter-layer motion prediction includes the prediction of block coding mode, header information, etc., wherein motion from the lower layer may be used for prediction of the higher layer. In case of intra coding, a prediction from surrounding macroblocks or from co-located macroblocks of lower layers is possible. These prediction techniques do not employ information from earlier coded access units and hence, are referred to as intra prediction techniques. Furthermore, residual data from lower layers can also be employed for prediction of the current layer.

After motion compensation followed by adding inverse transformed residual, a reconstructed picture is obtained. This picture usually has various artifacts such as blocking, ringing etc. In order to eliminate the artifacts, various post-processing operations are applied. If the post-processed pictures are used as reference in the motion compensation loop, then the post-processing operations/filters are usually called loop filters. By employing loop filters, the quality of the reference pictures increases. As a result, better coding efficiency can be achieved.

SVC specifies a concept known as single-loop decoding. It is enabled by using a constrained intra texture prediction mode, whereby the inter-layer intra texture prediction can be applied to macroblocks (MBs) for which the corresponding block of the base layer is located inside intra-MBs. At the same time, those intra-MBs in the base layer use constrained intra-prediction (e.g., having the syntax element "constrained_intra_pred_flag" equal to 1). In single-loop decoding, the decoder performs motion compensation and full picture reconstruction only for the scalable layer desired for playback (called the "desired layer" or the "target layer"), thereby greatly reducing decoding complexity. All of the layers other than the desired layer do not need to be fully decoded because all or part of the data of the MBs not used for inter-layer prediction (be it inter-layer intra texture prediction, inter-layer motion prediction or inter-layer residual prediction) is not needed for reconstruction of the desired layer.

A single decoding loop is needed for decoding of most pictures, while a second decoding loop is selectively applied to reconstruct the base representations, which are needed as prediction references but not for output or display, and are reconstructed only for the so called key pictures (for which "store_ref base_pic_flag" is equal to 1).

In contrast to single-loop decoding, many decoding methods for decoding scalable video bitstreams use multi-loop decoding, in which a picture on a scalable layer is decoded and the decoded sample values may be used for inter-layer prediction. For example, Annex O of ITU-T Recommendation H.263 specifies a multi-loop scalable decoding operation. A decoded picture may also be stored as a reference picture for inter prediction for other pictures typically on the same scalable layer.

One of the loop filters is deblocking filter. Deblocking filter is available in both H.264/AVC and HEVC standards. The aim of the deblocking filter is to remove the blocking artifacts occurring in the boundaries of the blocks. This is achieved by filtering along the block boundaries.

Figure 6:
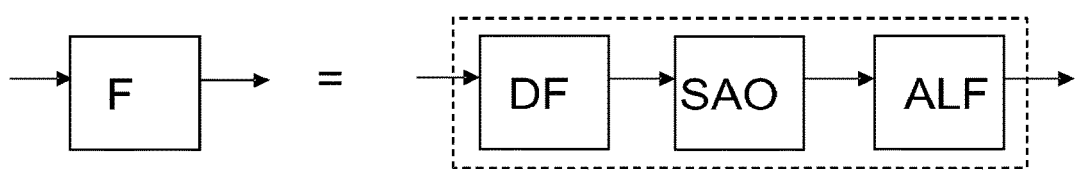
FIG. 6 shows schematically a filter block usable in HEVC codecs.

In HEVC, two new loop filters are introduced, namely, Sample Adaptive Offset (SAO) and Adaptive Loop Filter (ALF). SAO is applied after the deblocking filtering and ALF is applied after SAO. The loop filters are illustrated in FIG. 6, where the whole filtering block F corresponds to the filtering block F (316) in FIG. 4.

In SAO, the picture is divided into regions where a separate SAO decision is made for each region. The SAO information in a region is encapsulated in SAO parameters adaptation unit (SAO unit) and in HEVC, the basic unit for adapting SAO parameters is CTU (therefore an SAO region is the block covered by the corresponding CTU).

In SAO algorithm, samples in a CTU are classified according to a set of rules and each classified set of samples are enhanced by adding offset values. The offset values are signalled in the bitstream. There are two types of offsets: 1) Band offset 2) Edge offset. For a CTU, either no SAO or band offset or edge offset is employed. Choice of whether no SAO or band or edge offset to be used is typically decided by encoder with RDO and signaled to the decoder.

In band offset, the whole range of sample values is divided into 32 equal-width bands. For example, for 8-bit samples, width of a band is 8 (=256/32). Out of 32 bands, 4 of them are selected and different offsets are signalled for each of the selected band. The selection decision is made by the encoder and signalled as follows: The index of the first band is signalled and then it is inferred that following 4 bands are the chosen ones. Band offset is usually useful in correcting errors in smooth regions.

In the edge offset type, first of all, the edge offset (EO) type is chosen out of four possible types (or edge classifications) where each type is associated with a direction: 1) vertical 2) horizontal 3) 135 degree diagonal and 4) 45 degree diagonal. The choice of the direction is given by the encoder and signalled to the decoder. Each type defines the location of two neighbour samples for a given sample based on the angle. Then each sample in the CTU is classified into one of five categories based on comparison of the sample value against the values of the two neighbour samples. The five categories are described as follows:

1. Current sample value is smaller than the two neighbour samples
2. Current sample value is smaller than one of the neighbours and equal to the other neighbour
3. Current sample value is greater than one of the neighbours and equal to the other neighbour
4. Current sample value is greater than two neighbour samples
5. None of the above These five categories are not required to be signalled to the decoder because the classification is based on only reconstructed samples, which are available and identical in both the encoder and decoder. After each sample in a edge offset type CTU is classified as one of the five categories, an offset value for each of the first four categories is determined and signalled to the decoder. The offset for each category is added to the sample values associated with the corresponding category. Edge offsets are usually effective in correcting ringing artifacts.

The SAO parameters are signalled as interleaved in CTU data. Above CTU, slice header contains a syntax element specifying whether SAO is used in the slice. If SAO is used, then two additional syntax elements specify whether SAO is applied to Cb and Cr components. For each CTU, there are three options: 1) copying SAO parameters from the left CTU 2) copying SAO parameters from the above CTU or 3) signalling new SAO parameters.

Adaptive loop filter (ALF) is another method to enhance quality of the reconstructed samples. This is achieved by filtering the sample values in the loop. Typically, the encoder determines which region of the pictures are to be filtered and the filter coefficients based on RDO and this information is signalled to the decoder.

A coding standard may include a sub-bitstream extraction process, and such is specified for example in SVC, MVC, and HEVC. The sub-bitstream extraction process relates to converting a bitstream by removing NAL units to a sub-bitstream. The sub-bitstream still remains conforming to the standard. For example, in a draft HEVC standard, the bitstream created by excluding all VCL NAL units having a temporal_id greater than a selected value and including all other VCL NAL units remains conforming. In another version of the a draft HEVC standard, the sub-bitstream extraction process takes a TemporalId and/or a list of LayerId values as input and derives a sub-bitstream (also known as a bitstream subset) by removing from the bitstream all NAL units with TemporalId greater than the input TemporalId or layer_id value not among the values in the input list of LayerId values.

In a draft HEVC standard, the operation point the decoder uses may be set through variables TargetDecLayerIdSet and HighestTid as follows. The list TargetDecLayerIdSet, which specifies the set of values for layer_id of VCL NAL units to be decoded, may be specified by external means, such as decoder control logic. If not specified by external means, the list TargetDecLayerIdSet contains one value for layer_id, which is indicates the base layer (i.e. is equal to 0 in a draft HEVC standard). The variable HighestTid, which identifies the highest temporal sub-layer, may be specified by external means. If not specified by external means, HighestTid is set to the highest TemporalId value that may be present in the coded video sequence or bitstream, such as the value of sps_max_sub_layers_minus1 in a draft HEVC standard. The sub-bitstream extraction process may be applied with TargetDecLayerIdSet and HighestTid as inputs and the output assigned to a bitstream referred to as BitstreamToDecode. The decoding process may operate for each coded picture in BitstreamToDecode.

Zero or more operation points enabled by a bitstream may be specified for example in a video parameter set or a sequence parameter set. Operation points may be specified for example using a list of decoded layers (e.g. identified by their LayerId values) and operation points may be indexed in their order of appearance in the containing structure, such as a video parameter set or a sequence parameter se. The listed layers along with layers the listed layers depend on belong to an operation point. The decoder may operate at one of the listed operation points (hereafter, a target operation point). A leaf layer within an operation point may be defined as a layer which no other layer within the operation point depends on.

Many video coding standards specify buffering models and buffering parameters for the bit streams. Such buffering models may be called Hypothetical Reference Decoder (HRD) or Video Buffer Verifier (VBV). A standard compliant bit stream complies with the buffering model with a set of buffering parameters specified in the corresponding standard. Such buffering parameters for a bit stream may be explicitly or implicitly signaled. 'Implicitly signaled' means that the default buffering parameter values according to the profile and level apply. The HRD/VBV parameters are used, among other things, to impose constraints on the bit rate variations of compliant bit streams.

HRD conformance checking may concern for example the following two types of bitstreams: The first such type of bitstream, called Type I bitstream, is a NAL unit stream containing only the VCL NAL units and filler data NAL units for all access units in the bitstream. The second type of bitstream, called a Type II bitstream, may contain, in addition to the VCL NAL units and filler data NAL units for all access units in the bitstream, additional non-VCL NAL units other than filler data NAL units and/or syntax elements such as leading_zero_8 bits, zero_byte, start_code_prefix_one_3 bytes, and trailing_zero_8 bits that form a byte stream from the NAL unit stream.

Two types of HRD parameters (NAL HRD parameters and VCL HRD parameters) may be used. The HRD parameter may be indicated through video usability information included in the sequence parameter set syntax structure.

Sequence parameter sets and picture parameter sets referred to in the VCL NAL units, and corresponding buffering period and picture timing SEI messages may be conveyed to the HRD, in a timely manner, either in the bitstream (by non-VCL NAL units), or by out-of-band means externally from the bitstream e.g. using a signalling mechanism, such as media parameters included in the media line of a session description formatted e.g. according to the Session Description Protocol (SDP). For the purpose of counting bits in the HRD, only the appropriate bits that are actually present in the bitstream may be counted. When the content of a non-VCL NAL unit is conveyed for the application by some means other than presence within the bitstream, the representation of the content of the non-VCL NAL unit may or may not use the same syntax as would be used if the non-VCL NAL unit were in the bitstream.

The HRD may contain a coded picture buffer (CPB), an instantaneous decoding process, a decoded picture buffer (DPB), and output cropping.

The CPB may operate on decoding unit basis. A decoding unit may be an access unit or it may be a subset of an access unit, such as an integer number of NAL units. The selection of the decoding unit may be indicated by an encoder in the bitstream.

The HRD may operate as follows. Data associated with decoding units that flow into the CPB according to a specified arrival schedule may be delivered by the Hypothetical Stream Scheduler (HSS). The arrival schedule may be determined by the encoder and indicated for example through picture timing SEI messages, and/or the arrival schedule may be derived for example based on a bitrate which may be indicated for example as part of HRD parameters in video usability information. The HRD parameters in video usability information may contain many sets of parameters, each for different bitrate or delivery schedule. The data associated with each decoding unit may be removed and decoded instantaneously by the instantaneous decoding process at CPB removal times. A CPB removal time may be determined for example using an initial CPB buffering delay, which may be determined by the encoder and indicated for example through a buffering period SEI message, and differential removal delays indicated for each picture for example though picture timing SEI messages. Each decoded picture is placed in the DPB. A decoded picture may be removed from the DPB at the later of the DPB output time or the time that it becomes no longer needed for inter-prediction reference. Thus, the operation of the CPB of the HRD may comprise timing of bitstream arrival, timing of decoding unit removal and decoding of decoding unit. The operation of the DPB may for example comprise picture decoding, picture output, picture marking (e.g. as "used for reference" and "unused for reference") and picture removal from the DPB. Picture output may be based on picture output times that may be indicated in the bitstream or by external means, or it may be based on a "bumping" process, which may free or unallocated frame buffers of the DPB when all available frame buffers have become occupied.

The encoder and/or the decoder and/or the HRD may conclude a variable controlling picture output, PicOutputFlag, as follows: If the current picture is a TFD picture and the previous RAP picture in decoding order is a BLA picture or is a CRA picture that is the first coded picture in the bitstream, PicOutputFlag is set equal to 0 (indicating that the picture is not intended for output). Otherwise, PicOutputFlag is set equal to the value of a syntax element, such as pic_output_flag in a draft HEVC standard, indicating whether the picture is intended for output.

The DPB may operate for example as follows. The decoded picture buffer contains picture storage buffers. Each of the picture storage buffers may contain a decoded picture that is marked as "used for reference" or is held for future output. Prior to initialization, the DPB is empty (the DPB fullness is set to zero). The DPB operation may comprise one or more of the following steps, which may take place in the order listed below:
1. Removal of pictures from the DPB, which may comprise one or more of the following operations: The removal of pictures from the DPB before decoding of the current picture (but after parsing the slice header of the first slice of the current picture) happens instantaneously at the CPB removal time of the first decoding unit of access unit n (containing the current picture) and proceeds as follows. The reference picture set for the current picture is first decoded. If the current picture is an IDR or a BLA picture, and either the picture extents (i.e. horizontal and/or vertical sample count) changes in the IDR or the BLA picture or the output of prior pictures is indicated to be omitted in the IDR or the BLA picture (with no_output_of prior_pics_flag or similar being equal to 1), all picture storage buffers in the DPB are emptied without output of the pictures they contain, and DPB fullness is set to 0. All pictures k in the DPB, for which both of the following conditions are true, are removed from the DPB:
   picture k is marked as "unused for reference", picture k is not intended to be output (e.g. PictOutputFlag is equal to 0) or its DPB output time is less than or equal to the CPB removal time of the first decoding unit (denoted as decoding unit m) of the current picture n. When a picture is removed from the DPB, the DPB fullness is decremented by one.
2. Picture output, which may comprise one or more of the following operations: The following happens instantaneously at the CPB removal time of access unit n, $t_r(n)$. When picture n is intended for output (e.g. PictOutputFlag equal to 1), its DPB output time is derived for example on the basis of an output delay value, such as pic_dpb_output_delay in a draft HEVC standard, provided in a syntax structure, such as a picture timing SEI message in a draft HEVC standard. If picture n is intended for output and its output time is equal to its CPB removal time, the picture is output. Otherwise, if picture n is not intended for output, it is stored in the DPB as described in step 3. Otherwise (picture n is intended for output and its output time is greater than its CPB removal time), it is stored in the DPB as described in step 3 and output later (unless inferred later not to be output according to step 1). When output, the picture is cropped, using the cropping rectangle specified in the active sequence parameter set.
3. Current decoded picture marking and storage, which may comprise one or more of the following operations: The following happens instantaneously at the CPB removal time of access unit n, n): The current decoded picture is stored in the DPB in an empty picture storage buffer, the DPB fullness is incremented by one, and the current picture is marked as "used for short-term reference".

The HRD may be used to check conformance of bitstreams and decoders.

Bitstream conformance requirements of the HRD may comprise for example the following and/or alike. The CPB is required not to overflow (relative to the size which may be indicated for example within HRD parameters of video usability information) or underflow (i.e. the removal time of a decoding unit cannot be smaller than the arrival time of the last bit of that decoding unit). The number of pictures in the DPB may be required to be smaller than or equal to a certain maximum number, which may be indicated for example in the sequence parameter set. All pictures used as prediction references may be required to be present in the DPB. It may be required that the interval for outputting consecutive pictures from the DPB is not smaller than a certain minimum.

Decoder conformance requirements of the HRD may comprise for example the following and/or alike. A decoder claiming conformance to a specific profile and level may be required to decode successfully all conforming bitstreams specified for decoder conformance provided that all sequence parameter sets and picture parameter sets referred to in the VCL NAL units, and appropriate buffering period and picture timing SEI messages are conveyed to the decoder, in a timely manner, either in the bitstream (by non-VCL NAL units), or by external means. There may be two types of conformance that can be claimed by a decoder: output timing conformance and output order conformance.

To check conformance of a decoder, test bitstreams conforming to the claimed profile and level may be delivered by a hypothetical stream scheduler (HSS) both to the HRD and to the decoder under test (DUT). All pictures output by the HRD may also be required to be output by the DUT and, for each picture output by the HRD, the values of all samples that are output by the DUT for the corresponding picture may also be required to be equal to the values of the samples output by the HRD.

For output timing decoder conformance, the HSS may operate e.g. with delivery schedules selected from those indicated in the HRD parameters of video usability information, or with "interpolated" delivery schedules. The same delivery schedule may be used for both the HRD and DUT. For output timing decoder conformance, the timing (relative to the delivery time of the first bit) of picture output may be required to be the same for both HRD and the DUT up to a fixed delay.

For output order decoder conformance, the HSS may deliver the bitstream to the DUT "by demand" from the DUT, meaning that the HSS delivers bits (in decoding order) only when the DUT requires more bits to proceed with its processing. The HSS may deliver the bitstream to the HRD by one of the schedules specified in the bitstream such that the bit rate and CPB size are restricted. The order of pictures output may be required to be the same for both HRD and the DUT.

A modified HRD may be used for example for verifying output order conformance. A modified HRD may include an output order DPB and which may use a bumping process to remove pictures from the DPB when the DPB is fully occupied.

In some video coding schemes, such as a draft HEVC standard, an encoder may indicate decoded picture buffering requirements or characteristics to be used in a decoder and/or in the HRD. For example, in a draft HEVC standard the video parameter set syntax structure includes vps_max_dec_pic_buffering[i], vps_max_num_reorder_frames[i] and vps_max_latency_increase[i] syntax elements as described earlier. In a draft HEVC standard, respective syntax elements sps_max_dec_pic_buffering[i], sps_max_num_reorder_frames[i] and sps_max_latency_increase[i] are present in the sequence parameter set syntax structure and specify the values in effect within a coded video sequence for which the sequence parameter set is active.

Figure 7:
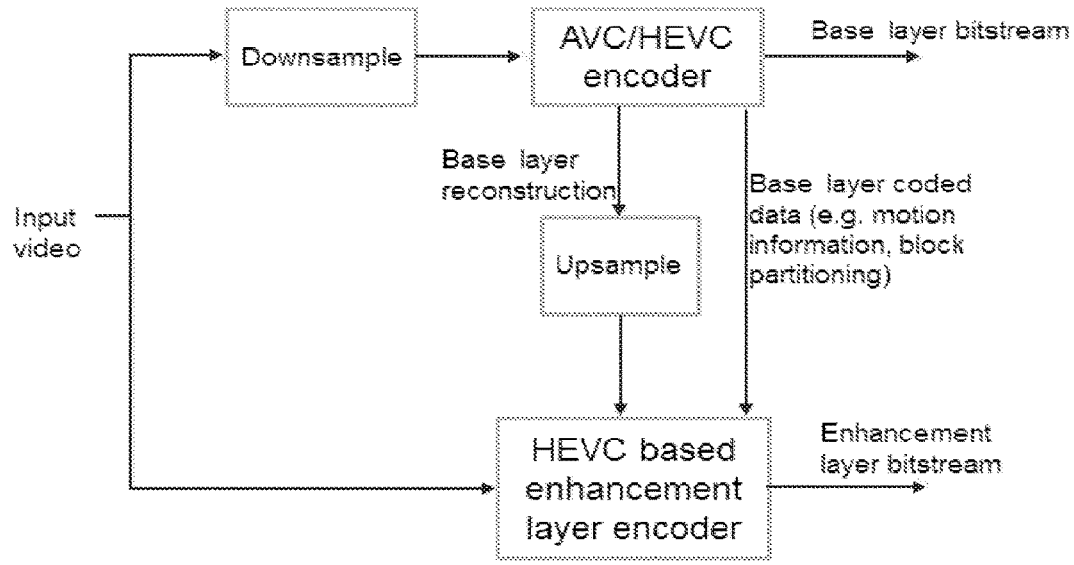
FIG. 7 shows schematically a structure of a spatial scalability encoder.
Figure 8:
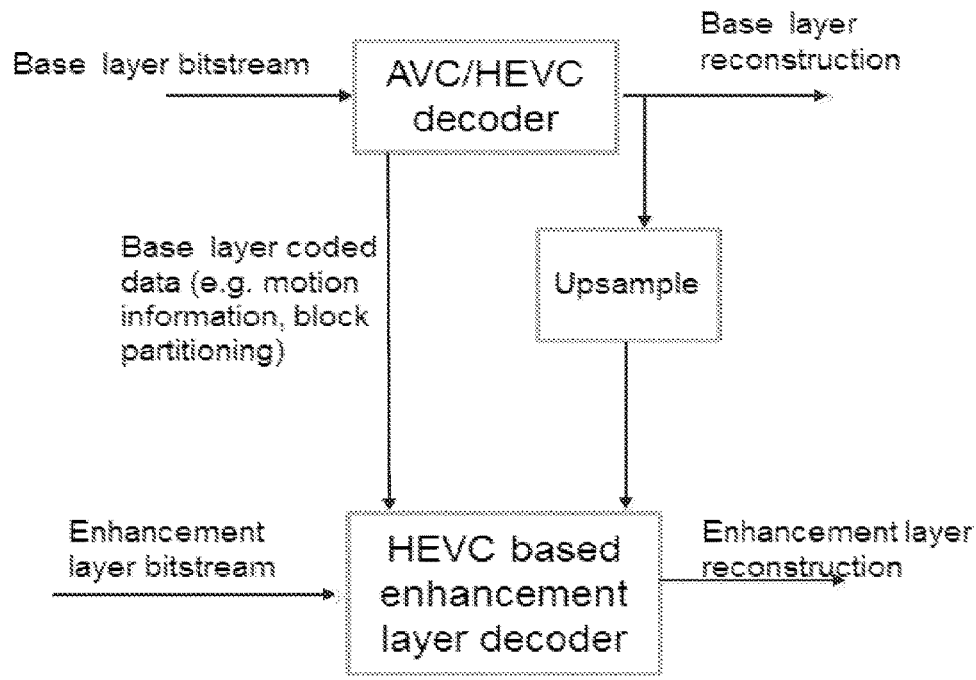
FIG. 8 shows schematically a structure of a spatial scalability decoder.

A scalable video codec for quality scalability (also known as Signal-to-Noise or SNR) and/or spatial scalability may be implemented as follows. For a base layer, a conventional non-scalable video encoder and decoder are used. The reconstructed/decoded pictures of the base layer are included in the reference picture buffer for an enhancement layer. In H.264/AVC, HEVC, and similar codecs using reference picture list(s) for inter prediction, the base layer decoded pictures may be inserted into a reference picture list(s) for coding/decoding of an enhancement layer picture similarly to the decoded reference pictures of the enhancement layer. Consequently, the encoder may choose a base-layer reference picture as inter prediction reference and indicate its use typically with a reference picture index in the coded bitstream. The decoder decodes from the bitstream, for example from a reference picture index, that a base-layer picture is used as inter prediction reference for the enhancement layer. When a decoded base-layer picture is used as prediction reference for an enhancement layer, it is referred to as an inter-layer reference picture. The structure and operation principle of a typical scalable encoder/decoder is illustrated in FIGS. 7 and 8.

In addition to quality scalability, scalability may be achieved as spatial scalability, where base layer pictures are coded at a higher resolution than enhancement layer pictures, bit-depth scalability, where base layer pictures are coded at lower bit-depth than enhancement layer pictures, or chroma format scalability, where base layer pictures provide higher fidelity in chroma than enhancement layer pictures.

Another type of scalability is standard scalability. In this type, the base layer and enhancement layer belong to different video coding standards. An example case is where the base layer is coded with H.264/AVC whereas the enhancement layer is coded with HEVC. The motivation behind this type of scalability is that in this way, the same bitstream can be decoded by both legacy H.264/AVC based systems as well as new HEVC based systems.

As mentioned above, H.264/SVC uses the single loop decoding, where enhancement layer pictures are coded only referring to intra coded samples from the base layer and also decoded syntax elements. This means, temporally predicted blocks are not decoded in the base layer and only a single motion compensated loop is needed to decode the enhancement layer pictures.

Nevertheless, the single loop decoding has drawbacks, mainly due to the fact that syntax elements related to inter pictures still need to be decoded. In other words, entire inter base layer pictures still need to be transmitted to the scalable decoder, even if only a small portion of data within the picture is required for the enhancement layer decoding process. If applied in HEVC, reconstructing motion vectors is not a trivial task, as the motion vector coding is significantly more complex than H.264/AVC due to the AMVP and merge modes. Moreover, single loop decoding is not applicable for standard scalable use-cases in a straightforward manner (e.g. enhancement layer is coded with Scalable HEVC, while base layer is coded with H.264/AVC) as the syntax elements of base layer is needed.

Multi-loop decoding, on the other hand, may require relatively large memory storage and memory access bandwidth, as decoded pictures on many scalable layers may be stored for inter-layer and/or inter prediction for subsequent pictures in decoding order.

To alleviate these problems, a sequence level indication of an encoding configuration, where only samples and syntax from intra coded pictures of base layer is used for coding the enhancement layer pictures, is provided in some embodiments. Using this indication, a network element would know beforehand that inter coded pictures of base layer are not needed for decoding enhancement layer and could discard those pictures in the base layer if the receiver indicates only the enhancement layer decoding is needed. Furthermore, a single motion compensated prediction loop is needed to decode the enhancement layer pictures. In addition, the scalable decoder does not need to keep track of motion vector prediction process for base layer pictures. The enhancement layer decoder does neither need to keep track of motion related syntax elements of the base layer.

According to an embodiment, a sequence level indication of an encoding configuration, where only samples and syntax from indicated types of pictures of base layer is used for coding the enhancement layer pictures, is provided. Using this indication, a network element would know beforehand that indicated types of pictures on the base layer are not needed for decoding enhancement layer and could discard those pictures in the base layer if the receiver indicates only the enhancement layer decoding is needed.

According to an embodiment, the sequence level indication of an encoding configuration as described above may be further limited to certain values or ranges of scalability dimensions. These values or ranges of scalability dimensions may be indicated by the encoder along the sequence level indicated of an encoding configuration. For example, the sequence level indication of an encoding configuration as described above may be limited to be in effect only for the indicated picture types on indicated temporal_id values.

Figure 9:
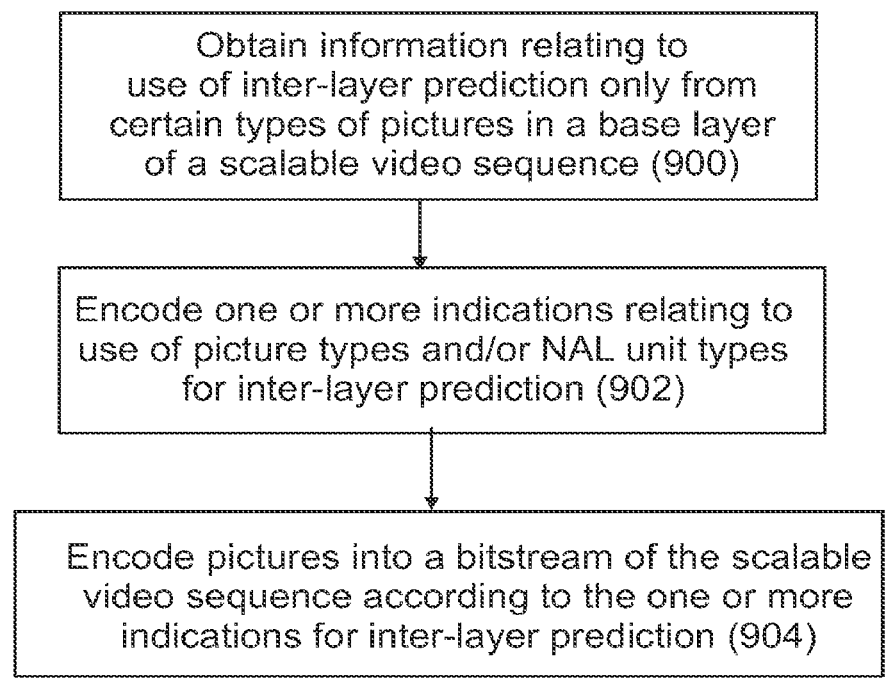
FIG. 9 shows a flow chart of an encoding process according to some embodiments of the invention.

A first aspect involves a method and related apparatuses, typically involving an encoder and/or computer program code to be executed by a processor, for encoding the indication and the related bitstream of pictures according to the indication. The method is illustrated in the flow chart of FIG. 9. In the method, an encoder obtains (900) information relating to use of inter-layer prediction only from certain types of pictures in a base layer of a scalable video sequence. Then the encoder encodes (902) one or more indications relating to use of picture types and/or NAL unit types for inter-layer prediction, and encodes (904) pictures into a bitstream of the scalable video sequence according to the one or more indications for inter-layer prediction.

An encoder may obtain (900) information relating to use of inter-layer prediction only from certain types of pictures in a base layer of a scalable video sequence for example through one or more of the following means:

The encoder may be configured to receive an encoding mode preference indication or command from a decoder or decoders, which are decoding the encoded bitstream. For example, a decoder may have limited memory storage or processing power for multi-loop operation and may indicate the picture type(s) or NAL unit types where multi-loop decoding is preferred or can be supported and for example a minimum interval or maximum frequency for pictures of such picture type(s). For example, in a video telephone or video conferencing application, there can be provided a signaling mechanism that a receiver (which may also be referred to as the decoding side) indicates such an encoding mode preference indication or command. As the decoding preferences may be varying as a function of time (e.g. due to varying resources available in a multi-tasking operating system), the receiver may have means to signal new encoding mode preferences or commands during the session. For example, one or more new codec control messages may be specified similarly to the codec control messages specified in IETF RFC 5104. The codec control messages may use the Audio-Visual Profile with Feedback (AVPF, IETF RFC 4585) to convey messages over the Real-Time Transport Control Protocol (RTCP, IETF RFC 3550).

The encoder or an application control logic controlling the encoder may constrain the encoder to use of inter-layer prediction only from certain types of pictures for example on the basis of available computational and/or memory resources in the encoding device.

The encoder may analyze the input video data, e.g. its motion activity, and estimate how much rate-distortion improvement inter-layer prediction could provide when it is used for all picture types compared to when it is used for certain types of pictures only.

According to an embodiment, the information relating to use of inter-layer prediction restricts the use of inter-layer prediction to intra-coded pictures in a base layer of a scalable video sequence. This may be useful for the standard scalability scenario where base layer syntax may not be accessible for the enhancement layer decoder.

In some embodiments, the encoder and/or the encoding process and/or the decoder and/or the decoding process and/or the HRD may include a first interface or interfaces (e.g. an application programming interface or API) to input a reconstructed or decoded picture of a base layer. The first interface(s) may include or have a mechanism to provide information characterizing or associated with the reconstructed/decoded picture, including but not limited to any number of the following:

layer_id value or similar layer identifier or a combination of scalability dimension identifier values (e.g. dependency_id and quality_id values)

temporal_id value or similar indicating the temporal sub-layer for which the reconstructed/decoded component picture belongs to spatial extents (e.g. horizontal and vertical sample counts)

information related to coding mode, block partitioning, motion vectors and other syntax elements or derived variables of the coded component picture corresponding to the reconstructed/decoded component picture provided through the interface picture order count value or similar value indicating an output order frame number value or similar value indicating a decoding order an output or playback time a decoding time and/or alike.

According to an embodiment, the information relating to use of inter-layer prediction restricts the use of inter-layer prediction to random access point (RAP) pictures in a base layer of a scalable video sequence.

According to an embodiment, the method further comprises determining the information relating to use of inter-layer prediction on the basis of available computational resources, available memory for reference frame storage, available memory access bandwidth, and/or implemented inter-layer coding tools.

According to an embodiment, the method further comprises encoding said one or more indications in one or more syntax elements.

According to an embodiment, wherein said one or more syntax elements are included in a video parameter set structure, a sequence parameter set structure, and/or a supplemental enhancement information (SEI) message.

In the following table 3, including said syntax element in a video parameter set structure of the draft HEVC standard is illustrated in an exemplified manner Additions in syntax are indicated by italics.

TABLE 3

| | Descriptor |
|---|---|
| video_parameter_set_rbsp( ) { | |
|   video_parameter_set_id | u(4) |
|   ... /* HEVC version 1 VPS syntax elements */ | |
|   vps_extension_reserved_one_flag | u(1) |
|   ... /* byte alignment */ | |
|   *inter_layer_pred_only_rap_flag* | u(1) |
|   /* other scalable extension syntax elements */ | |
|   vps_extension2_flag | u(1) |
|   if( vps_extension2_flag ) | |
|     while( more_rbsp_data( ) ) | |
|       vps_extension_data_flag | u(1) |
|   } | |
|   rbsp_trailing_bits( ) | |
| } | |

In this example, when the value of the syntax element inter_layer_pred_only_rap_flag equals to 0, it specifies that the reference for inter-layer prediction may be of any picture type. When the value of the syntax element inter_layer_pred_only_rap_flag equals to 1, it specifies that the reference for inter-layer prediction shall be a RAP picture and shall not be a picture of any other picture type than a RAP picture. Instead of or in addition to the video parameter set, the syntax element may be included in a sequence parameter set structure, a supplemental enhancement information (SEI) message and/or any other corresponding syntax structure.

The indications relating to use of inter-layer prediction may be used for various types of scalability, such as quality scalability, bit-depth scalability, spatial scalability and chroma format scalability.

According to an embodiment, the one or more indications may be indicated to be specific to a certain combination or combinations of one or more target layers (using inter-layer prediction) and one or more reference layers.

The encoded video sequence and the associated information relating to use of inter-layer prediction may be transmitted to a receiving apparatus, or the receiving apparatus may download the encoded video sequence and the associated information relating to use of inter-layer prediction, for example as a file download or by streaming. The transfer path may include a bitstream modifier, such as a media-aware network element (MANE), for adjusting the bitstream of the video sequence, for example according to prevailing network conditions or the properties of the receiving apparatus. For example, the network server 26 of FIG. 3 may operate as a bitstream modifier.

Figure 10:
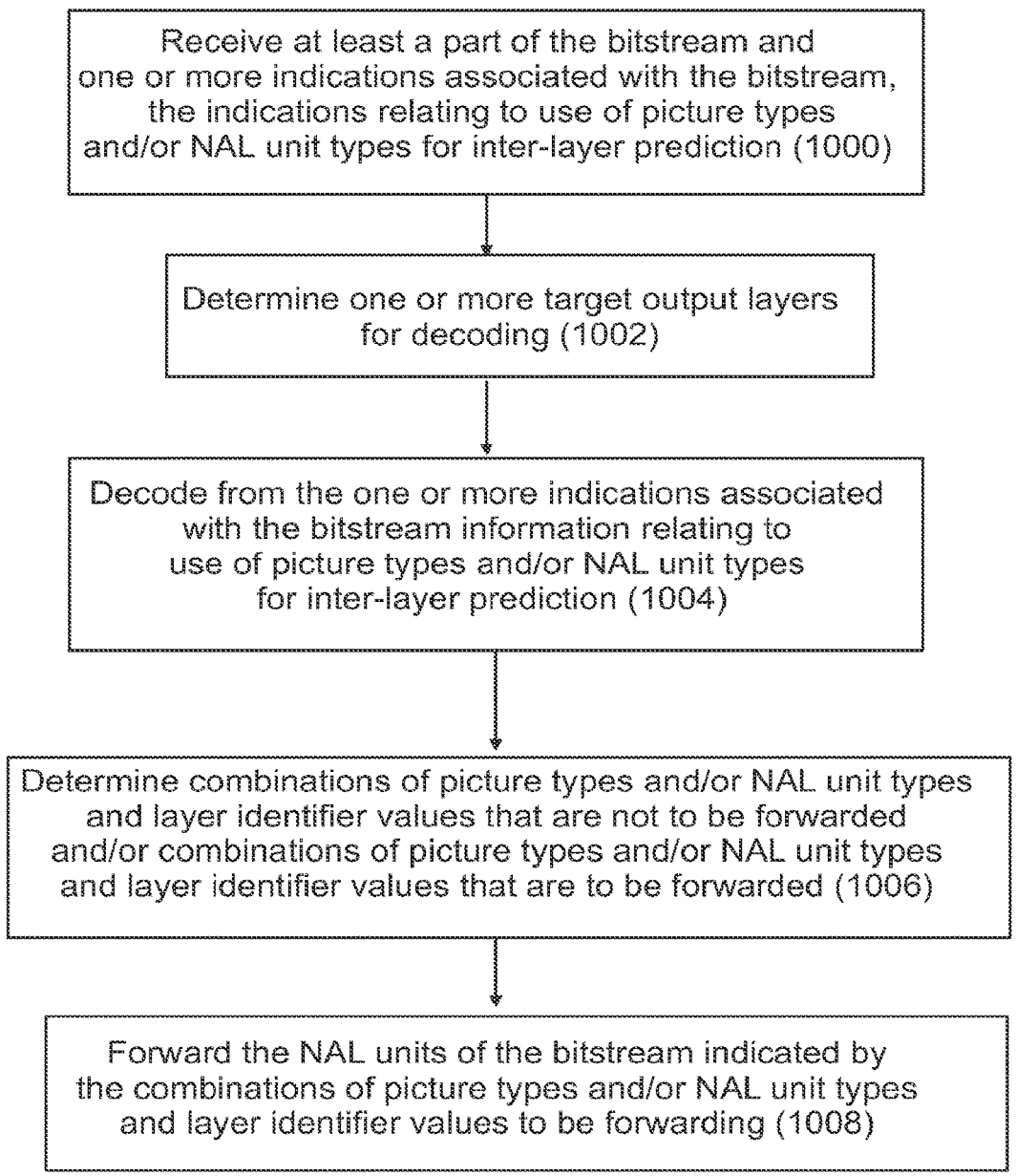
FIG. 10 shows a flow chart of a bitstream modifying process according to some embodiments of the invention.

Hence, another aspect involves a method and related apparatuses for modifying the bitstream of pictures according to the one or more indications. The method is illustrated in the flow chart of FIG. 10. In the method, the bitstream modifier, such as a media-aware network element (MANE), receives (1000) at least a part of the bitstream, e.g. receiving one access unit, coded picture, or NAL unit at a time in a streaming manner. The bitstream modifier may determine (1002) one or more target output layer(s) or may be configured to use particular target output layer(s). The determination may be based, for example, on prevailing or estimated throughput or congestion in the downlink part of the network and/or known or expected receiver capabilities. The target output layers may be characterized by more than one layer identifier, such as TemporalId and LayerId in a draft HEVC standard.

The bitstream modifier receives and decodes (1004) the one or more indications associated with the bitstream, the indications concerning picture types and/or NAL unit types and their use for inter-layer prediction. The bitstream modifier concludes (1006) combinations of layer identifier values and picture types (which may be indicated as NAL unit type values) that are not to be forwarded and/or combinations of layer identifier values and picture types (which may be indicated as NAL unit type values) that are to be forwarded. Based on said combinations of layer identifier values and picture types, the bitstream modifier then either forwards (1008) or discards NAL units. It should be noted that forwarding may alternatively or additionally mean storage or transmission of the modified bitstream of the video sequence.

According to an embodiment, a sub-bitstream extraction process using the one or more indications to determine the pictures and/or NAL units to be excluded from the bitstream subset that is output by the process. The sub-bitstream extraction process may input one or more target output layer(s) that are included in the bitstream subset and/or one or more excluded layer(s) that are omitted from the bitstream subset. The target output layers and/or the excluded layers may be characterized by more than one layer identifier, such as TemporalId and LayerId in a draft HEVC standard. The sub-bitstream extraction receives and decodes the one or more indications associated with the bitstream, the indications concerning picture types and/or NAL unit types and their use for inter-layer prediction. The sub-bitstream extraction process concludes combinations of layer identifier values and picture types (which may be indicated as NAL unit type values) that are not to be included in the bitstream subset and/or combinations of layer identifier values and picture types (which may be indicated as NAL unit type values) that are to be included in the bitstream subset. Based on said combinations of layer identifier values and picture types, the sub-bitstream extraction process then either includes NAL units in the bitstream subset or omits NAL units from the bitstream subset.

Figure 11:
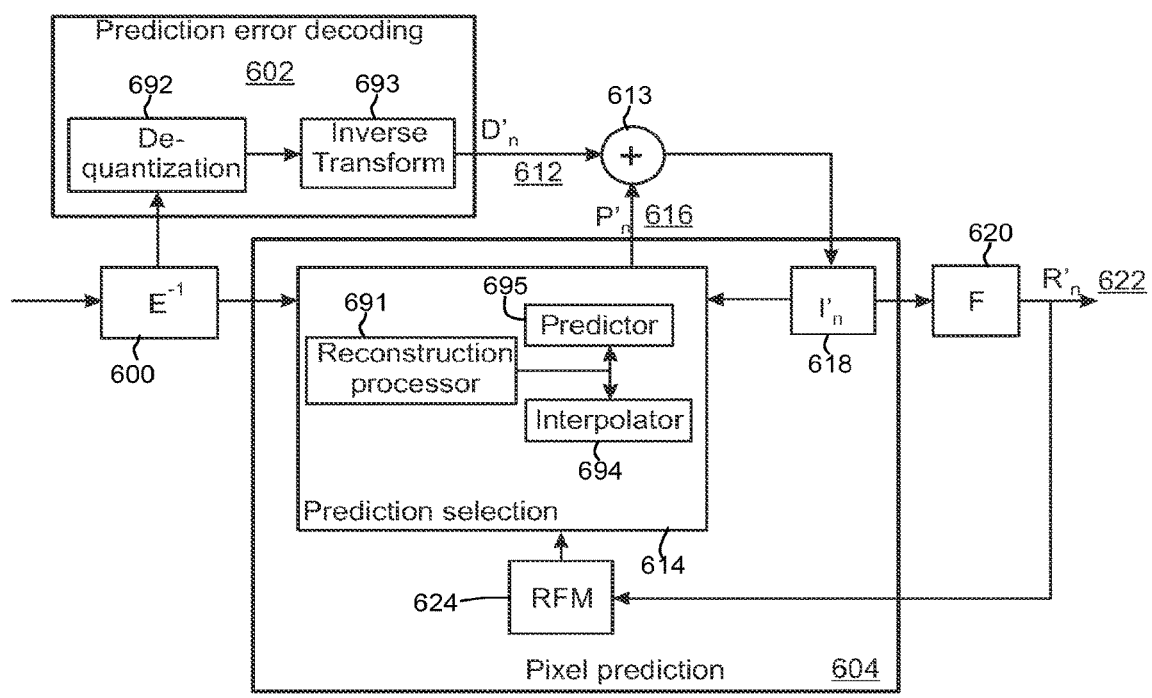
FIG. 11 shows a schematic diagram of a decoder according to some embodiments of the invention.

A further aspect of the invention is operation of the decoder in a receiving apparatus when it receives the bitstream of the video sequence and one or more indications associated with the bitstream. FIG. 11 shows a block diagram of a video decoder suitable for employing embodiments of the invention.

The decoder includes an entropy decoder 600 which performs entropy decoding on the received signal as an inverse operation to the entropy encoder 330 of the encoder described above. The entropy decoder 600 outputs the results of the entropy decoding to a prediction error decoder 602 and pixel predictor 604.

The pixel predictor 604 receives the output of the entropy decoder 600. A predictor selector 614 within the pixel predictor 604 determines that an intra-prediction, an inter-prediction, or interpolation operation is to be carried out. The predictor selector may furthermore output a predicted representation of an image block 616 to a first combiner 613. The predicted representation of the image block 616 is used in conjunction with the reconstructed prediction error signal 612 to generate a preliminary reconstructed image 618. The preliminary reconstructed image 618 may be used in the predictor 614 or may be passed to a filter 620. The filter 620 applies a filtering which outputs a final reconstructed signal 622. The final reconstructed signal 622 may be stored in a reference frame memory 624, the reference frame memory 624 further being connected to the predictor 614 for prediction operations.

The prediction error decoder 602 receives the output of the entropy decoder 600. A dequantizer 692 of the prediction error decoder 602 may dequantize the output of the entropy decoder 600 and the inverse transform block 693 may perform an inverse transform operation to the dequantized signal output by the dequantizer 692. The output of the entropy decoder 600 may also indicate that prediction error signal is not to be applied and in this case the prediction error decoder produces an all zero output signal.

Figure 12:
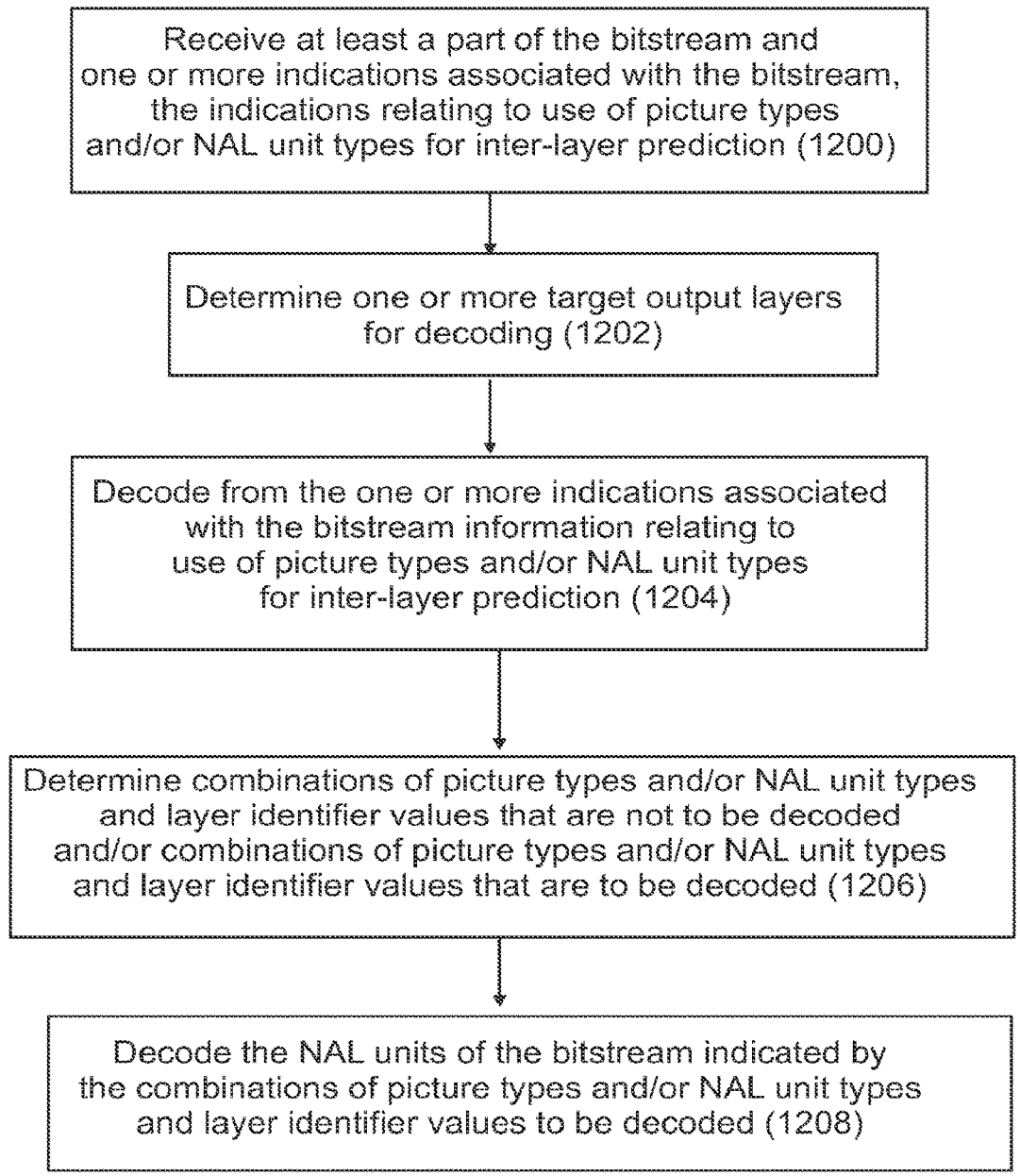
FIG. 12 shows a flow chart of a decoding process according to some embodiments of the invention.

The decoding operations of the embodiments are illustrated in the flow chart of FIG. 12. In the method, the decoder receives (1200) at least a part of the bitstream, e.g. receiving one access unit, coded picture, or NAL unit at a time in a streaming manner. The decoder may determine (1202) one or more target output layer(s) or may be configured to use particular target output layer(s). The determination may be based, for example, on available computational capacity. The target output layers may be characterized by more than one layer identifier, such as TemporalId and LayerId in a draft HEVC standard.

The decoder receives and decodes (1204) from the one or more indications associated with the bitstream, the indications concerning picture types and/or NAL unit types and their use for inter-layer prediction. The decoder concludes (1206) combinations of layer identifier values and picture types (which may be indicated as NAL unit type values) that are not to be decoded and/or combinations of layer identifier values and picture types (which may be indicated as NAL unit type values) that are to be decoded. Based on said combinations of layer identifier values and picture types, the decoder either decodes (1208) or omits/ignores NAL units of the bitstream.

According to an embodiment the encoder and/or the decoder maintains a picture marking status or similar, according to which pictures may be for example marked as "used for reference" (or equivalently "used for inter reference") or "unused for reference" (or equivalently "unused for inter reference"). In an embodiment, pictures may additionally be marked as "used for inter-layer reference" (or alike) and "unused for inter-layer reference" (or alike). According to an embodiment, the decoder uses the one or more indications relating to use of picture types and/or NAL unit types for inter-layer prediction in determining the marking of a picture as "used for inter-layer reference" (or alike), or as "unused for inter-layer reference" (or alike). According to an embodiment, the encoder either uses the information relating to use of inter-layer prediction only from certain types of pictures in a base layer or uses the one or more indications relating to use of picture types and/or NAL unit types for inter-layer prediction in determining the marking of a picture as "used for inter-layer reference" (or alike), or as "unused for inter-layer reference" (or alike).

The encoder and/or the decoder and/or the HRD may set the inter-layer marking status of a reference layer (RL) picture as "used for inter-layer reference" or alike when it is concluded that the RL picture is needed as an inter-layer prediction reference for a picture in an enhancement layer (EL) and as "unused for inter-layer reference" or alike when it is concluded that the RL picture is not needed as an inter-layer prediction reference for a picture in the EL.

Marking a picture as "used for inter-layer reference" (or alike) or as "unused for inter-layer reference" (or alike) may additionally include any of the following aspects:
  Inter-layer prediction dependencies, which may be for example indicated in a video parameter set or a sequence parameter set.
  A target operation point for decoding, which may be used to determine which layers are decoded.
  A picture-wise indication, which may for example indicate one or more of the following: the picture is potentially used as reference for inter-layer prediction, and/or the picture is not used as reference for inter-layer prediction, and/or the picture uses another picture as reference for inter-layer prediction, and/or the picture does not use any other picture as reference for inter-layer prediction.

Some aspects are described in more details in the following.

The encoder may determine or conclude whether a picture in a reference layer (RL) is needed as an inter-layer prediction reference for a picture in an enhancement layer (EL). The determination or conclusion process may include but is not limited to one or more of the following:
a. The encoder may be pre-defined or configured to omit inter-layer prediction for certain temporal sub-layers and/or for certain hierarchy levels of the inter prediction hierarchy and/or for certain picture types.
b. The encoder may encoder an EL picture with normal coding process, e.g. using rate-distortion-optimized selection of the prediction modes and/or references, and afterwards conclude if the RL picture was used as inter-layer prediction reference.

The encoder may include one or more indications in the bitstream whether an RL picture is used as inter-layer reference for one or more EL pictures. The one or more indications may be coded as part of one or more coded data units (e.g. NAL units) of the RL picture and/or they may be coded as part of one or more coded data units of the one or more EL pictures. The one or more indications may be for example included in the NAL unit header structure, for example as a specific value or values of the NAL unit type. Alternatively or in addition, the one or more indications may be for example included in a prefix NAL unit and/or in a slice extension. For example, an indication in the slice extension for coded slices of a RL picture could include a flag, which when equal to 0 indicates that the RL picture is not used for inter-layer prediction of any EL picture and when equal to 1 indicates that the RL picture may be used for inter-layer prediction.

The decoder may conclude whether an RL picture is needed as an inter-layer prediction reference for a picture in the EL. The decoder may receive and decoded from one or more indications from the bitstream, indicating or specifying whether a picture of the RL is used as inter-layer reference for one or more EL pictures. For example, the decoder may receive and decode an indication in the slice extension for coded slices of an RL picture could, which when equal to 0 indicates that the RL picture is not used for inter-layer prediction of any EL picture and when equal to 1 indicates that the RL picture may be used for inter-layer prediction.

It needs to be understood that the determination or conclusion whether a picture in the RL is needed as an inter-layer prediction reference for a picture in the EL may further involve categorization to different types or dimensions of scalability, e.g. determination or conclusion whether the picture in the RL is "used/unused for inter-component prediction" and/or "used/unused for coarse-granular inter-layer scalability reference" for the picture in the EL.

A picture may be marked as "used for inter-layer reference" (or alike) or "unused for inter-layer reference" (or alike) for example immediately after its reconstruction (in the encoder) or decoding (in the decoder).

In an embodiment, marking of a picture as "used for inter-layer reference" (or alike) may be done when one or more of the following are true:

The picture is on a layer that is among the layers of the target operation point and is not a leaf layer within the target operation point.
  A picture-wise indication indicates that the picture is or is potentially used as inter-layer reference.
  The picture type of the picture is among those that may be used for inter-layer prediction according to the one or more indications relating to use of picture types and/or NAL unit types for inter-layer prediction. Additionally, the scalability identifier value or values associated with the picture may be required to be within certain range or ranges of scalability dimensions.

In different embodiments, a different combination of the above may be required to be true in order to mark the picture as "used for inter-layer reference" (or alike). If one or more of the criteria above for a combination of criteria is not true, the picture may be marked as "unused for inter-layer reference".

A picture that is marked as "used for inter-layer reference" may be subsequently marked as "unused for inter-layer reference" e.g. when all pictures (of the same POC value and within the same target operation point) that use the picture as inter-layer reference (according to the dependencies provided e.g. in the active VPS) have been decoded.

The DPB process may be operated in a "nested" manner separately for each layer. However, inter-layer dependency and/or prediction relations may be taken into account in the DPB process. The DPB process may conclude layer-wise which pictures of a layer are needed as inter prediction reference for other pictures within that layer. The DPB process may conclude when a picture is no longer needed as inter-layer reference similarly to the encoder and/or decoder operation for marking of pictures as "used for inter-layer reference" and "unused for inter-layer reference". The DPB process may remove the picture, i.e. empty or mark as unoccupied or deallocate the frame/picture buffer or the part of the frame/picture buffer containing the picture, when a set of criteria, including the criterion that the picture is not or is no longer needed as inter-layer reference, is fulfilled. The set of criteria may additionally contain requirements that the picture is not or is no longer needed as inter prediction reference and/or the picture is not or is no longer needed for output.

In some embodiments, an encoder or a buffer verifier determines HRD parameters for a bitstream including information relating to use of inter-layer prediction only from certain types of pictures in a base layer of a scalable video sequence for an operation point or a combination of layers that causes pictures with certain picture types not to be decoded. In some embodiments, an encoder or a buffer verifier additionally or alternatively determines HRD parameters for a sub-bitstream generated by a sub-bitstream extraction process that uses information relating to use of inter-layer prediction only from certain types of pictures in a base layer of a scalable video sequence and takes an operation point or a combination of layers as input to the process. The HRD parameters may for example include an initial CPB removal time and an initial DPB removal delay. The HRD parameters may for example be indicated within VUI and/or appropriate SEI messages such as buffering period SEI and picture timing SEI messages similar to those of H.264/AVC and HEVC. The HRD parameters may be specifically indicated to concern a decoder operation where certain picture types are not decoded (at certain layers) and a certain target operation point or a certain combination of layers to be decoded. The HRD parameters may alternatively or additionally be indicated to concern a sub-bitstream with a certain operation point or a certain combination of layers given as input to the sub-bitstream extraction process. In some embodiments, an encoder or buffer verifier may indicate one or more profiles and/or levels the sub-bitstream conforms to for example in a sequence parameter set and/or a video parameter set and/or an SEI message.

Several advantages may be obtained using the indication described above. Using the one or more indications, a network element may discard inter coded pictures in the base layer if the receiver indicates that only the enhancement layer decoding is needed. Furthermore, a single motion compensated prediction loop may be needed to decode the enhancement layer pictures. In addition, the scalable decoder may not need to keep track of motion vector prediction process for base layer pictures. Also, entropy decoding, such as CABAC (Context Adaptive Binary Arithmetic Coding) parsing, may not be needed for the base layer pictures other than the intra pictures.

In the above, some embodiments have been described with reference to an enhancement layer and a base layer. It needs to be understood that the base layer may as well be any other layer as long as it is a reference layer for the enhancement layer. It also needs to be understood that the encoder may generate more than two layers into a bitstream and the decoder may decode more than two layers from the bitstream. Embodiments could be realized with any pair of an enhancement layer and its reference layer. Likewise, many embodiments could be realized with consideration of more than two layers.

In the above, some embodiments have been described in relation to particular types of parameter sets. It needs to be understood, however, that embodiments could be realized with any type of parameter set or other syntax structure in the bitstream.

In the above, some embodiments have been described in relation to encoding indications, syntax elements, and/or syntax structures into a bitstream or into a coded video sequence and/or decoding indications, syntax elements, and/or syntax structures from a bitstream or from a coded video sequence. It needs to be understood, however, that embodiments could be realized when encoding indications, syntax elements, and/or syntax structures into a syntax structure or a data unit that is external from a bitstream or a coded video sequence comprising video coding layer data, such as coded slices, and/or decoding indications, syntax elements, and/or syntax structures from a syntax structure or a data unit that is external from a bitstream or a coded video sequence comprising video coding layer data, such as coded slices. For example, in some embodiments, an indication according to any embodiment above may be coded into a video parameter set or a sequence parameter set, which is conveyed externally from a coded video sequence for example using a control protocol, such as SDP. Continuing the same example, a receiver may obtain the video parameter set or the sequence parameter set, for example using the control protocol, and provide the video parameter set or the sequence parameter set for decoding.

In the above, the example embodiments have been described with the help of syntax of the bitstream. It needs to be understood, however, that the corresponding structure and/or computer program may reside at the encoder for generating the bitstream and/or at the decoder for decoding the bitstream. Likewise, where the example embodiments have been described with reference to an encoder, it needs to be understood that the resulting bitstream and the decoder have corresponding elements in them. Likewise, where the example embodiments have been described with reference to a decoder, it needs to be understood that the encoder has structure and/or computer program for generating the bitstream to be decoded by the decoder.

The embodiments of the invention described above describe the codec in terms of separate encoder and decoder apparatus in order to assist the understanding of the processes involved. However, it would be appreciated that the apparatus, structures and operations may be implemented as a single encoder-decoder apparatus/structure/operation. Furthermore in some embodiments of the invention the coder and decoder may share some or all common elements.

Although the above examples describe embodiments of the invention operating within a codec within an electronic device, it would be appreciated that the invention as described below may be implemented as part of any video codec. Thus, for example, embodiments of the invention may be implemented in a video codec which may implement video coding over fixed or wired communication paths.

Thus, user equipment may comprise a video codec such as those described in embodiments of the invention above. It shall be appreciated that the term user equipment is intended to cover any suitable type of wireless user equipment, such as mobile telephones, portable data processing devices or portable web browsers.

Furthermore elements of a public land mobile network (PLMN) may also comprise video codecs as described above.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

A method according to a first embodiment involves a method comprising:

obtaining information relating to use of inter-layer prediction only from certain types of pictures in a base layer of a scalable video sequence;

encoding one or more indications relating to use of picture types and/or NAL unit types for inter-layer prediction; and encoding pictures into a bitstream of the scalable video sequence according to the one or more indication for inter-layer prediction.

According to an embodiment, the method further comprises encoding one or more additional indications refining the one or more indications relating to use of picture types and/or NAL unit types for inter-layer prediction to be specific for certain layers.

According to an embodiment, the information relating to use of inter-layer prediction restricts the use of inter-layer prediction to intra-coded pictures in a base layer of a scalable video sequence.

According to an embodiment, the information relating to use of inter-layer prediction restricts the use of inter-layer prediction to random access point (RAP) pictures in a base layer of a scalable video sequence.

According to an embodiment, the method further comprises determining the information relating to use of inter-layer prediction on the basis of available computational resources, available memory for reference frame storage, available memory access bandwidth, and/or implemented inter-layer coding tools.

According to an embodiment, the method further comprises encoding said one or more indications in one or more syntax elements.

According to an embodiment, wherein said one or more syntax elements are included in a video parameter set structure, a sequence parameter set structure, and/or a supplemental enhancement information (SEI) message.

An apparatus according to a second embodiment comprises:

a video encoder configured for encoding a scalable bitstream comprising a base layer and at least one enhancement layer, wherein said video encoder is further configured for obtaining information relating to use of inter-layer prediction only from certain types of pictures in a base layer of a scalable video sequence;

encoding one or more indications relating to use of picture types and/or NAL unit types for inter-layer prediction; and encoding pictures into a bitstream of the scalable video sequence according to the one or more indication for inter-layer prediction.

According to a third embodiment there is provided a computer readable storage medium stored with code thereon for use by an apparatus, which when executed by a processor, causes the apparatus to perform:

obtaining information relating to use of inter-layer prediction only from certain types of pictures in a base layer of a scalable video sequence;

encoding one or more indications relating to use of picture types and/or NAL unit types for inter-layer prediction; and encoding pictures into a bitstream of the scalable video sequence according to the one or more indication for inter-layer prediction.

According to a fourth embodiment there is provided at least one processor and at least one memory, said at least one memory stored with code thereon, which when executed by said at least one processor, causes an apparatus to perform:

obtaining information relating to use of inter-layer prediction only from certain types of pictures in a base layer of a scalable video sequence;

encoding one or more indications relating to use of picture types and/or NAL unit types for inter-layer prediction; and encoding pictures into a bitstream of the scalable video sequence according to the one or more indication for inter-layer prediction.

A method according to a fifth embodiment comprises a method for decoding a scalable bitstream comprising a base layer and at least one enhancement layer, the method comprising receiving at least a part of the bitstream and one or more indications associated with the bitstream, the indications relating to use of picture types and/or NAL unit types for inter-layer prediction;

determining one or more target output layers for decoding;

decoding from the one or more indications associated with the bitstream information relating to use of picture types and/or NAL unit types for inter-layer prediction;

determining combinations of picture types and/or NAL unit types and layer identifier values that are not to be decoded and/or combinations of picture types and/or NAL unit types and layer identifier values that are to be decoded; and decoding the NAL units of the bitstream indicated by the combinations of picture types and/or NAL unit types and layer identifier values to be decoded.

According to an embodiment, the method further comprises decoding one or more additional indications refining the one or more indications relating to use of picture types and/or NAL unit types for inter-layer prediction to be specific for certain layers.

According to an embodiment, the method further comprises omitting the NAL units of the bitstream indicated by the combinations of picture types and/or NAL unit types and layer identifier values not to be decoded.

According to an embodiment, the method further comprises determining the one or more target output layers for decoding on the basis available computational resources, available memory for reference frame storage, available memory access bandwidth, and/or implemented inter-layer coding tools of a decoding apparatus.

According to an embodiment, the one or more target output layers are characterized by more than one layer identifier.

According to an embodiment, the information relating to use of inter-layer prediction restricts the use of inter-layer prediction to intra-coded pictures in a base layer of a scalable video sequence.

According to an embodiment, the information relating to use of inter-layer prediction restricts the use of inter-layer prediction to random access point (RAP) pictures in a base layer of a scalable video sequence.

According to an embodiment, the method further comprises decoding said one or more indications from one or more syntax elements.

According to an embodiment, wherein said one or more syntax elements are included in a video parameter set structure, a sequence parameter set structure, and/or a supplemental enhancement information (SEI) message.

An apparatus according to a sixth embodiment comprises:
a video decoder configured for decoding a scalable bitstream comprising a base layer and at least one enhancement layer, the video decoder being configured for
receiving at least a part of the bitstream and one or more indications associated with the bitstream, the indications relating to use of picture types and/or NAL unit types for inter-layer prediction;
determining one or more target output layers for decoding;
decoding from the one or more indications associated with the bitstream information relating to use of picture types and/or NAL unit types for inter-layer prediction;
determining combinations of picture types and/or NAL unit types and layer identifier values that are not to be decoded and/or combinations of picture types and/or NAL unit types and layer identifier values that are to be decoded; and
decoding the NAL units of the bitstream indicated by the combinations of picture types and/or NAL unit types and layer identifier values to be decoded.

According to a seventh embodiment there is provided a computer readable storage medium stored with code thereon for use by an apparatus, which when executed by a processor, causes the apparatus to perform:
receiving at least a part of the bitstream and one or more indications associated with the bitstream, the indications relating to use of picture types and/or NAL unit types for inter-layer prediction;
determining one or more target output layers for decoding;
decoding from the one or more indications associated with the bitstream information relating to use of picture types and/or NAL unit types for inter-layer prediction;
determining combinations of picture types and/or NAL unit types and layer identifier values that are not to be decoded and/or combinations of picture types and/or NAL unit types and layer identifier values that are to be decoded; and
decoding the NAL units of the bitstream indicated by the combinations of picture types and/or NAL unit types and layer identifier values to be decoded.

According to an eighth embodiment there is provided at least one processor and at least one memory, said at least one memory stored with code thereon, which when executed by said at least one processor, causes an apparatus to perform:
receiving at least a part of the bitstream and one or more indications associated with the bitstream, the indications relating to use of picture types and/or NAL unit types for inter-layer prediction;
determining one or more target output layers for decoding;
decoding from the one or more indications associated with the bitstream information relating to use of picture types and/or NAL unit types for inter-layer prediction;
determining combinations of picture types and/or NAL unit types and layer identifier values that are not to be decoded and/or combinations of picture types and/or NAL unit types and layer identifier values that are to be decoded; and
decoding the NAL units of the bitstream indicated by the combinations of picture types and/or NAL unit types and layer identifier values to be decoded.

A method according to a ninth embodiment comprises a method for modifying a scalable bitstream comprising a base layer and at least one enhancement layer, the method comprising
receiving at least a part of the bitstream and one or more indications associated with the bitstream, the indications relating to use of picture types and/or NAL unit types for inter-layer prediction;
determining one or more target output layers for decoding;
decoding from the one or more indications associated with the bitstream information relating to use of picture types and/or NAL unit types for inter-layer prediction;
determining combinations of picture types and/or NAL unit types and layer identifier values that are not to be forwarded and/or combinations of picture types and/or NAL unit types and layer identifier values that are to be forwarded; and
forwarding the NAL units of the bitstream indicated by the combinations of picture types and/or NAL unit types and layer identifier values to be forwarding.

An apparatus according to a tenth embodiment comprises:
a bitstream modifier configured for modifying a scalable bitstream comprising a base layer and at least one enhancement layer, the bitstream modifier being configured for
receiving at least a part of the bitstream and one or more indications associated with the bitstream, the indications relating to use of picture types and/or NAL unit types for inter-layer prediction;
determining one or more target output layers for decoding;
decoding from the one or more indications associated with the bitstream information relating to use of picture types and/or NAL unit types for inter-layer prediction;
determining combinations of picture types and/or NAL unit types and layer identifier values that are not to be forwarded and/or combinations of picture types and/or NAL unit types and layer identifier values that are to be forwarded; and
forwarding the NAL units of the bitstream indicated by the combinations of picture types and/or NAL unit types and layer identifier values to be forwarding.

According to an eleventh embodiment there is provided a video encoder configured for encoding a scalable bitstream comprising a base layer and at least one enhancement layer, wherein said video encoder is further configured for:
obtaining information relating to use of inter-layer prediction only from certain types of pictures in a base layer of a scalable video sequence;
encoding one or more indications relating to use of picture types and/or NAL unit types for inter-layer prediction; and
encoding pictures into a bitstream of the scalable video sequence according to the one or more indication for inter-layer prediction.

According to a twelfth embodiment there is provided a video decoder configured for decoding a scalable bitstream comprising a base layer and at least one enhancement layer, wherein said video decoder is further configured for:
receiving at least a part of the bitstream and one or more indications associated with the bitstream, the indications relating to use of picture types and/or NAL unit types for inter-layer prediction;
determining one or more target output layers for decoding;

decoding from the one or more indications associated with the bitstream information relating to use of picture types and/or NAL unit types for inter-layer prediction;

determining combinations of picture types and/or NAL unit types and layer identifier values that are not to be decoded and/or combinations of picture types and/or NAL unit types and layer identifier values that are to be decoded; and decoding the NAL units of the bitstream indicated by the combinations of picture types and/or NAL unit types and layer identifier values to be decoded.

The invention claimed is:

1. A method for decoding a scalable bitstream comprising a base layer and at least one enhancement layer, the method comprising receiving at least a part of the bitstream and one or more indications in a video parameter set associated with one or more coded video sequences within the bitstream, the video parameter set including parameters that apply to the one or more coded video sequences, and the one or more coded video sequences comprising a sequence of consecutive access units in decoding order from an instantaneous decoding refresh access unit to a next instantaneous decoding refresh access unit, the indications relating to use of picture types and/or network abstraction layer (NAL) unit types for inter-layer prediction;

determining, by a processor, one or more target output layers for, decoding;

decoding, by the processor, from the one or more indications information relating to use of picture types and/or NAL unit types for inter-layer prediction, wherein the information relating to use of inter-layer prediction restricts the use of inter-layer prediction to intra-coded pictures in a base layer of a scalable video sequence;

determining, by the processor, combinations of picture types and/or NAL unit types and layer identifier values that are not to be decoded and/or combinations of picture types and/or NAL unit types and layer identifier values that are to be decoded; and decoding, by the processor, the NAL units of the bitstream indicated by the combinations of picture types and/or NAL unit types and layer identifier values to be decoded.

2. The method according to claim 1, the method further comprising decoding one or more additional indications refining the one or more indications relating to use of picture types and/or NAL unit types for inter-layer prediction to be specific for certain of the base or enhancement layers.

3. The method according to claim 1, the method further comprising omitting the NAL units of the bitstream indicated by the combinations of picture types and/or NAL unit types and layer identifier values not to be decoded.

4. The method according to claim 1, wherein the information relating to use of inter-layer prediction restricts the use of inter-layer prediction to random access point (RAP) pictures in a base layer of a scalable video sequence.

5. The method according to claim 1, the method further comprising decoding said one or more indications from one or more syntax elements, wherein said one or more syntax elements are included in a video parameter set structure, a sequence parameter set structure, and/or a supplemental enhancement information (SEI) message.

6. The method according to claim 1, wherein the combinations of picture types and/or NAL unit types and layer identifier values comprise a layer identifier list that specifies an increasing order of the layer identifier values.

7. An apparatus comprising:

a video decoder, configured for decoding a scalable bitstream comprising a base layer and at least one enhancement layer, the apparatus being configured for receiving at least a part of the bitstream and one or more indications in a video parameter set associated with one or more coded video sequences within the bitstream, the video parameter set including parameters that apply to the one or more coded video sequences, and the one or more coded video sequences comprising a sequence of consecutive access units in decoding order from an instantaneous decoding refresh access unit to a next instantaneous decoding refresh access unit, the indications relating to use of picture types and/or network abstraction layer (NAL) unit types for inter-layer prediction;

determining one or more target output layers for decoding;

decoding from the one or more indications information relating to use of picture types and/or NAL unit types for inter-layer prediction, wherein the information relating to use of inter-layer prediction restricts the use of inter-layer prediction to intra-coded pictures in the base layer of the scalable bitstream;

determining combinations of picture types and/or NAL unit types and layer identifier values that are not to be decoded and/or combinations of picture types and/or NAL unit types and layer identifier values that are to be decoded; and decoding the NAL units of the bitstream indicated by the combinations of picture types and/or NAL unit types and layer identifier values to be decoded.

8. The apparatus according to claim 7, the apparatus being further configured for decoding one or more additional indications refining the one or more indications relating to use of picture types and/or NAL unit types for inter-layer prediction to be specific for certain of the base or enhancement layers.

9. The apparatus according to claim 7, the apparatus being further configured for omitting the NAL units of the bitstream indicated by the combinations of picture types and/or NAL unit types and layer identifier values not to be decoded.

10. The apparatus according to claim 7, wherein the combinations of picture types and/or NAL unit types and layer identifier values comprise a layer identifier list that specifies an increasing order of the layer identifier values.

11. A method comprising:

obtaining information relating to use of inter-layer prediction only from certain types of pictures in a base layer of a scalable video sequence, wherein the information relating to use of inter-layer prediction restricts the use of inter-layer prediction to intra-coded pictures in the base layer;

encoding, by a processor, one or more indications in a video parameter set associated with one or more coded video sequences within the scalable video sequence, the one or more indications relating to use of picture types and/or network abstraction layer (NAL) unit types for inter-layer prediction, the video parameter set including parameters that apply to the one or more coded video sequences, and the one or more coded video sequences comprising a sequence of consecutive access units in decoding order from an instantaneous decoding refresh access unit to a next instantaneous decoding refresh access unit; and encoding, by the processor, pictures into a bitstream of the scalable video sequence according to the one or more indication for inter-layer prediction.

12. The method according to claim 11, the method further comprising encoding one or more additional indications refining the one or more indications relating to use of picture types and/or NAL unit types for inter-layer prediction to be specific for certain of the base or enhancement layers.

13. The method according to claim 11, wherein the information relating to use of inter-layer prediction restricts the use of inter-layer prediction to random access point (RAP) pictures in a base layer of a scalable video sequence.

14. The method according to claim 11, the method further comprising encoding said one or more indications in one or more syntax elements, wherein said one or more syntax elements are included in a video parameter set structure, a sequence parameter set structure, and/or a supplemental enhancement information (SEI) message.

15. An apparatus comprising:

a video encoder configured for encoding a scalable bitstream comprising a base layer and at least one enhancement layer, wherein said apparatus is further configured for obtaining information relating to use of inter-layer prediction only from certain types of pictures in a base layer of a scalable video sequence, wherein the information relating to use of inter-layer prediction restricts the use of inter-layer prediction to intra-coded pictures in, the base layer, encoding one or more indications in a video parameter set associated with one or more coded video sequences within the scalable video sequence, the one or more indications relating to use of picture types and/or network abstraction layer (NAL) unit types for inter-layer prediction, the video parameter set including parameters that apply to the one or more coded video sequences, and the one or more coded video sequences comprising a sequence of consecutive access units in decoding order from an instantaneous decoding refresh access unit to a next instantaneous decoding refresh access unit; and encoding pictures into a bitstream of the scalable video sequence according to the one or more indication for inter-layer prediction.

16. The apparatus according to claim 15, the apparatus being further configured for encoding one or more additional indications refining the one or more indications relating to use of picture types and/or NAL unit types for inter-layer prediction to be specific for certain of the base or enhancement layers.

* * * * *

UNITED STATES PATENT AND TRADEMARK OFFICE
CERTIFICATE OF CORRECTION

PATENT NO. : 10,230,977 B2  
APPLICATION NO. : 15/645753  
DATED : March 12, 2019  
INVENTOR(S) : Ugur et al.

Page 1 of 1

It is certified that error appears in the above-identified patent and that said Letters Patent is hereby corrected as shown below:

In the Claims

Column 47  
Line 29, In Claim 1, "for, decoding" should read --for decoding--

Column 48  
Line 6, In Claim 7, "decoder, configured" should read --decoder configured--

Column 50  
Line 6, In Claim 15, "in, the base layer," should read --in the base layer--

Signed and Sealed this  
Nineteenth Day of November, 2019

Andrei Iancu  
*Director of the United States Patent and Trademark Office*